United States Patent
Yerramalli et al.

(10) Patent No.: US 11,575,424 B2
(45) Date of Patent: Feb. 7, 2023

(54) UE RECOMMENDED CSI SETTINGS

(71) Applicant: QUALCOMM Incorporated, San Diego, CA (US)

(72) Inventors: Srinivas Yerramalli, San Diego, CA (US); Xiaoxia Zhang, San Diego, CA (US); Taesang Yoo, San Diego, CA (US); Lorenzo Ferrari, Oakland, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/917,299

(22) Filed: Jun. 30, 2020

(65) Prior Publication Data

US 2021/0409086 A1 Dec. 30, 2021

(51) Int. Cl.
*H04W 4/00* (2018.01)
*H04B 7/06* (2006.01)
*H04W 76/27* (2018.01)
*H04W 72/04* (2009.01)
*H04W 72/12* (2009.01)
*H04W 80/02* (2009.01)

(52) U.S. Cl.
CPC ........ *H04B 7/0626* (2013.01); *H04W 72/042* (2013.01); *H04W 72/0413* (2013.01); *H04W 72/1273* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2018/0054290 A1* | 2/2018 | Park | H04B 7/0413 |
| 2018/0198510 A1* | 7/2018 | Park | H04B 7/06 |
| 2018/0279152 A1* | 9/2018 | Kim | H04W 72/046 |
| 2019/0149211 A1* | 5/2019 | Nilsson | H04B 7/0408 375/267 |
| 2019/0150013 A1* | 5/2019 | Zhang | H04W 24/10 375/224 |

(Continued)

OTHER PUBLICATIONS

International Search Report and Written Opinion—PCT/US2021/036601—ISA/EPO—dated Sep. 16, 2021.

*Primary Examiner* — Clemence S Han
(74) *Attorney, Agent, or Firm* — Loza & Loza LLP / Qualcomm

(57) ABSTRACT

Aspects relate to dynamically modifying channel state information (CSI) settings, such as CSI report settings and/or CSI resource settings, utilized by a user equipment (UE) in reporting CSI to a base station. For example, a UE may identify at least one parameter associated with a CSI setting and provide a recommendation to modify the CSI setting based on the at least one parameter to a base station. The recommendation may include, for example, an optimized configuration of the CSI setting or soft output, such as an uncertainty level or confidence level associated with the CSI setting. The base station may then select the optimized CSI setting based on the recommendation and provide the optimized CSI setting to the UE for use in generating and transmitting CSI reports to the base station. Other aspects, features, and embodiments are also claimed and described.

33 Claims, 17 Drawing Sheets

(56) References Cited

U.S. PATENT DOCUMENTS

| | | | |
|---|---|---|---|
| 2019/0245603 A1* | 8/2019 | Yum | H04L 5/0094 |
| 2019/0260448 A1* | 8/2019 | Rahman | H04B 7/0626 |
| 2019/0320453 A1* | 10/2019 | Hosseini | H04L 25/0202 |
| 2020/0084006 A1* | 3/2020 | Rahman | H04L 5/0057 |
| 2020/0112355 A1* | 4/2020 | Park | H04B 7/0626 |
| 2021/0306045 A1* | 9/2021 | Cha | H04B 17/318 |
| 2022/0006496 A1* | 1/2022 | Park | H04B 7/0695 |

* cited by examiner

UE RECOMMENDED CSI SETTINGS

TECHNICAL FIELD

The technology discussed below relates generally to wireless communication networks, and more particularly, to optimization of channel state information (CSI) reporting. Some embodiments and techniques enable and provide communication devices, methods, and systems for a user equipment (UE) to recommend optimized CSI settings.

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information-reference signals (CSI-RS) or synchronization signal blocks (SSBs), to the UE.

After channel estimation, the UE may return a channel state information (CSI) report indicating the quality of the channel to the base station. The CSI may include, for example, a channel quality indicator (CQI) that indicates to the base station an MCS to use for transmissions to the UE, a rank indicator (RI) that indicates to the base station the number of layers to use for transmissions to the UE, a precoding matrix indicator (PMI) that indicates to the base station the precoding matrix to use for transmissions to the UE, and other suitable parameters.

The base station (e.g., gNodeB (gNB)) can configure the UE with one or more CSI report settings. Each CSI report setting may indicate, for example, the CSI related parameters to be reported (e.g., one or more of the CQI, PMI, RI, etc.), the time-domain behavior of CSI reports (e.g., periodic, semi-persistent, or aperiodic), the frequency granularity for reporting the CQI and PMI (e.g., wideband or sub-band), codebook configuration, and other suitable parameters. Each CSI report setting may further be associated with a respective CSI resource setting that specifies the resource elements (REs) on which CSI-RSs may be transmitted, along with a set of ports at the gNB from which the CSI-RSs may be transmitted.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to some aspects, techniques discussed below enable and provide for communication components (e.g., UEs, smartphones, base stations, etc.) to dynamically modify CSI settings (e.g., CSI report settings and/or CSI resource settings) based on changing communication conditions, capabilities of the communication components, and/or performance factors associated with the communication components. For example, a UE may be able to identify at least one parameter associated with a CSI setting and provide a recommendation to modify the CSI setting based on the at least one parameter to a base station. The recommendation may include, for example, an optimized configuration of the CSI setting or soft output, such as an uncertainty level or confidence level associated with the CSI setting. The base station may then select the optimized CSI setting based on the recommendation and provide the optimized CSI setting to the UE for use in generating and transmitting CSI reports to the base station.

In one example, a method for wireless communication at a scheduled entity in a wireless communication network is disclosed. The method can include identifying at least one parameter associated with a channel state information (CSI) setting, transmitting a recommendation to modify the CSI setting based on the at least one parameter to a scheduling entity in wireless communication with the scheduled entity, receiving an optimized CSI setting from the scheduling entity based on the recommendation, and utilizing the optimized CSI setting for CSI reporting to the scheduling entity.

Another example provides a scheduled entity in a wireless communication network including a wireless transceiver, a memory, and a processor communicatively coupled to the wireless transceiver and the memory. The processor and the memory can be configured to identify at least one parameter associated with a channel state information (CSI) setting, transmit a recommendation to modify the CSI setting based on the at least one parameter to a scheduling entity in wireless communication with the scheduled entity via the wireless transceiver, receive an optimized CSI setting from the scheduling entity based on the recommendation via the wireless transceiver, and utilize the optimized CSI setting for CSI reporting to the scheduling entity.

In another example, a method for wireless communication at a scheduling entity in a wireless communication network is disclosed. The method can include receiving a recommendation to modify a channel state information (CSI) setting based on at least one parameter associated with the CSI setting from a scheduled entity in wireless communication with the scheduling entity, selecting an optimized CSI setting based on the recommendation, transmitting the optimized CSI setting to the scheduled entity, and receiving a CSI report from the scheduled entity based on the optimized CSI setting.

Another example provides a scheduling entity in a wireless communication network including a wireless transceiver, a memory, and a processor communicatively coupled to the wireless transceiver and the memory. The processor and the memory can be configured to receive a recommendation to modify a channel state information (CSI) setting based on at least one parameter associated with the CSI setting from a scheduled entity in wireless communication with the scheduling entity via the wireless transceiver, select an optimized CSI setting based on the recommendation, transmit the optimized CSI setting to the scheduled entity, and receive a CSI report from the scheduled entity based on the optimized CSI setting via the wireless transceiver.

Various method, system, device, and apparatus embodiments may also include additional features. For example, the at least one parameter can include an optimized configuration of the CSI setting and the optimized CSI setting can include the optimized configuration. In some examples, the optimized configuration of the CSI setting can include a respective optimized configuration of at least one of a CSI report type, a CSI report periodicity, a CSI resource set, a CSI report quantity, or a CSI report frequency granularity.

For example, the respective optimized configuration of the CSI resource set can include at least one of an optimized resource configuration of resources within the CSI resource set, additional resources to include in at least the CSI resource set, or one or more additional CSI resource sets including the CSI resource set. In some examples, the at least one parameter can include an uncertainty level or a confidence level associated with the CSI setting and the optimized CSI setting accommodates the uncertainty level or the confidence level.

In some examples, the recommendation can include the at least one parameter. In some examples, the recommendation can be transmitted within a radio resource control (RRC) message, a medium access control (MAC) control element (MAC-CE), or uplink control information (UCI). In some examples, the scheduled entity may further transmit a CSI report including the recommendation to the scheduling entity. In some examples, the optimized CSI setting may be transmitted within an RRC reconfiguration message. In some examples, the optimized CSI setting may be triggered via a MAC-CE or downlink control information (DCI).

In some examples, the scheduled entity may further perform an evaluation of the CSI setting based on at least one of a channel between the scheduled entity and the scheduling entity, a capability of the scheduled entity, or a performance of the scheduled entity. The scheduled entity may further generate the at least one parameter based on the evaluation. For example, the scheduled entity may predict the optimized CSI setting using at least one data-driven algorithm.

In some examples, the scheduled entity may further transmit to the scheduling entity a capability of the scheduled entity to provide the recommendation to the scheduling entity. For example, the scheduled entity may transmit at least one metric associated with the capability to the scheduling entity. The scheduling entity may identify at least one data-driven algorithm based on the at least one metric, and transmit the at least one data-driven algorithm to the scheduled entity.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
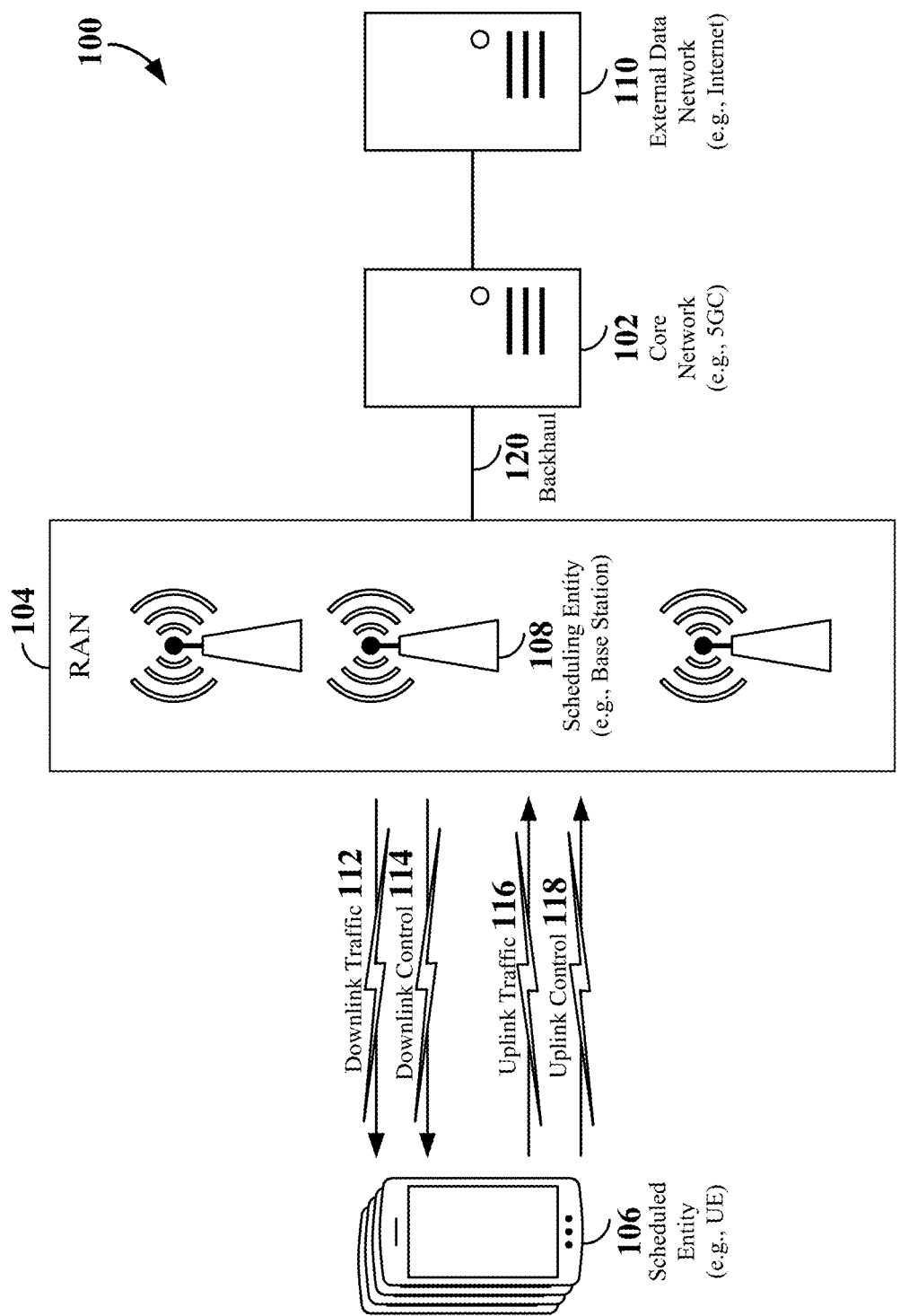
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and/or enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell.

Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
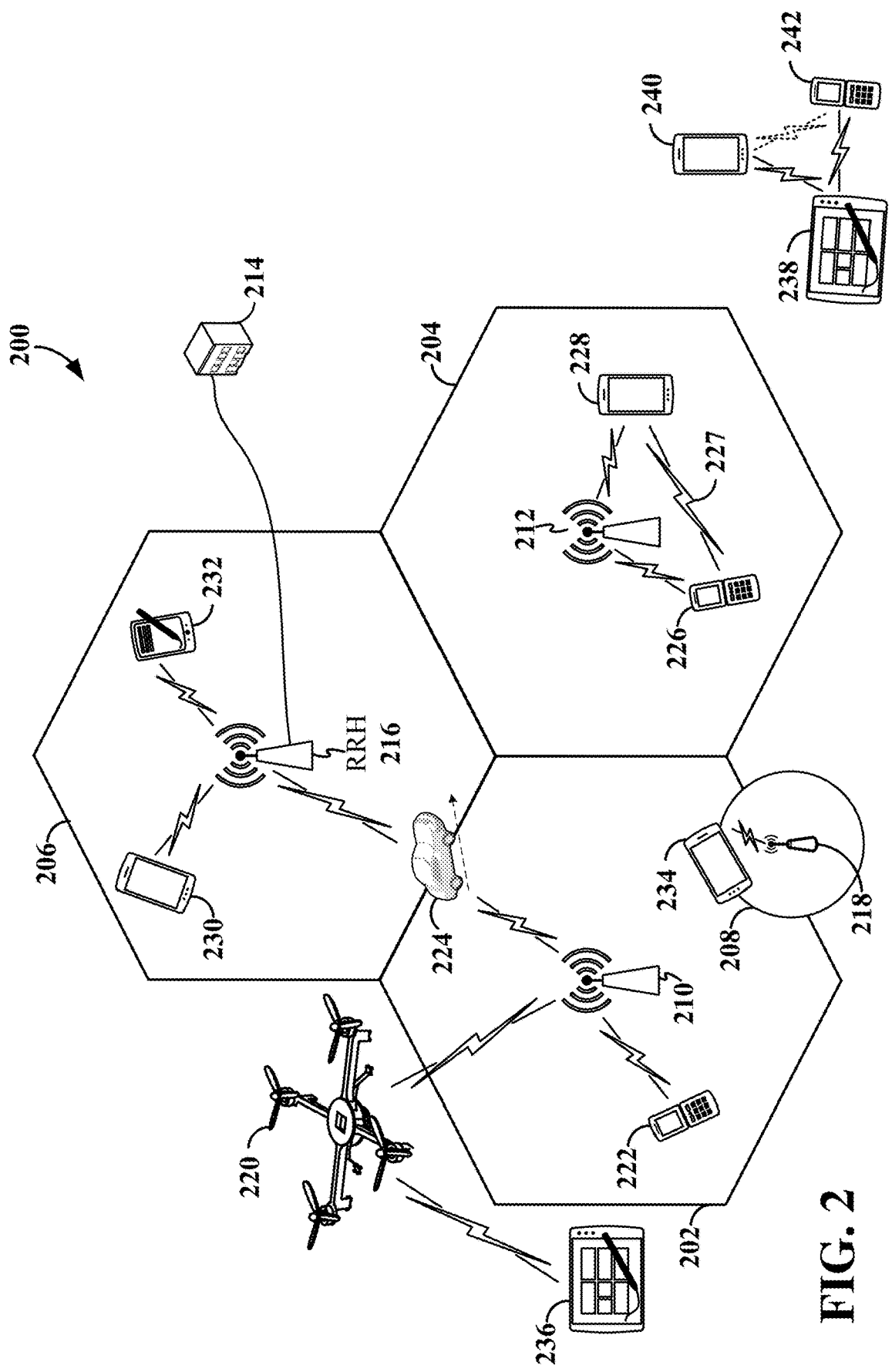
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device, and vice-versa.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF). The SCMF can manage, in whole or in part, the security context for both the control plane and the user plane functionality. The SEAF can perform authentication.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
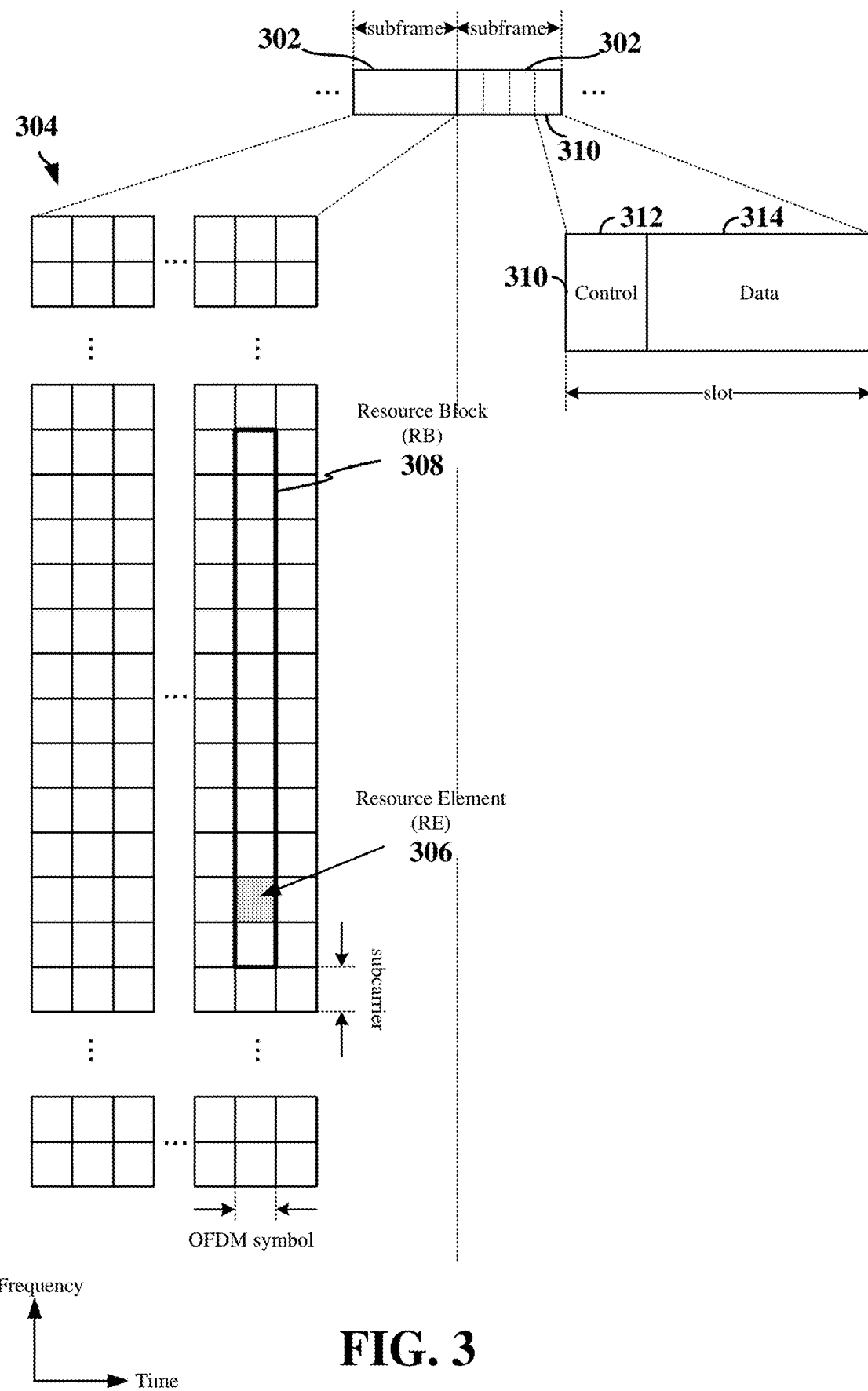
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIB s and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
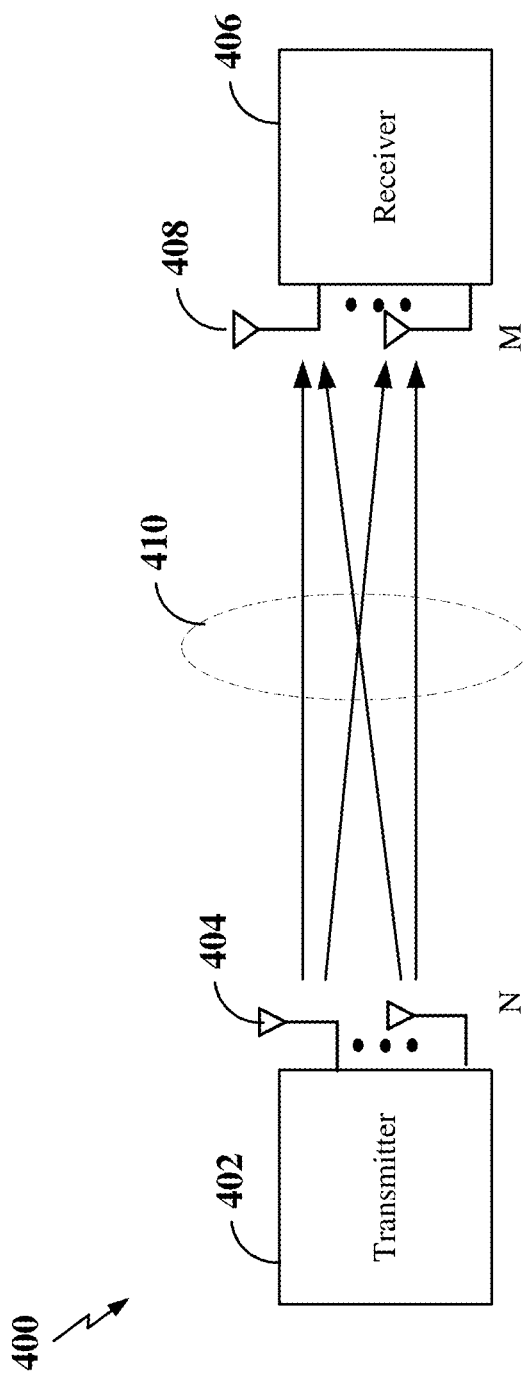
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO and/or beamforming system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In addition to L1 measurement reports, a UE can further utilize the reference signal(s) to estimate the channel quality of the channel between the base station and the UE. For example, the UE may measure the SINR of each received CSI-RS and generate a CSI report based on the measured SINR. The CSI report may include, for example, a channel quality indicator (CQI), rank indicator (RI), precoding matrix indicator (PMI), and/or strongest layer indicator (SLI). The scheduling entity may use the CSI report to select a rank for the scheduled entity (e.g., based on the RI), along with a precoding matrix (e.g., based on the PMI) and a MCS (e.g., based on the CQI) to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The SLI may be utilized to indicate which column of the precoding matrix of the reported PMI corresponds to the strongest layer codeword corresponding to the largest reported wideband CQI.

Figure 5:
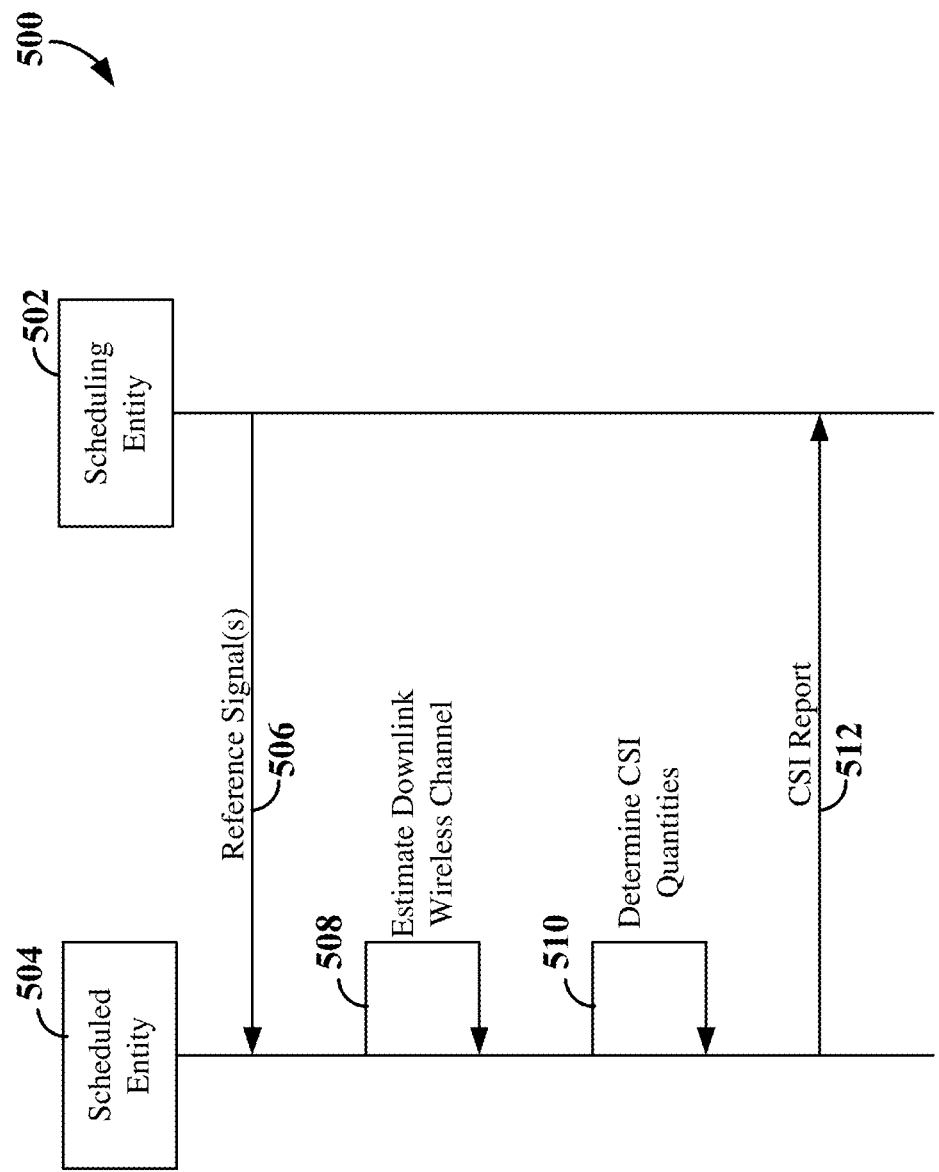
FIG. 5 is a signaling diagram illustrating exemplary signaling between a scheduling entity and a scheduled entity to provide channel state feedback (CSF) according to some aspects.

FIG. 5 is a signaling diagram illustrating exemplary signaling between a scheduling entity 502 and a scheduled entity 504 to provide channel state feedback (CSF) within a wireless network 500. In the illustrated scenario, the scheduled entity 504 can provide a CSI report to the scheduling entity 502. The wireless network 500 may correspond, for example, to the RAN 104 or 200 shown in FIG. 1 or 2. The scheduling entity 502 may correspond, for example, to a base station (e.g., gNB or eNB) or other scheduling entity as shown in FIGS. 1 and/or 2. The scheduled entity 504 may correspond, for example, to a UE or other scheduled node as shown in FIGS. 1 and/or 2.

At 506, the scheduling entity 502 may transmit a reference signal, such as a CSI-RS, to the scheduled entity 504. In some examples, the reference signal may include a plurality of reference signals. Reference signals may be transmitted via a respective channel measurement resource. Channel measurement resources may include time-frequency resources, along with a beam direction, within which a particular reference signal can be transmitted. For example, channel measurement resources may include a non-zero-power (NZP) CSI-RS resource. NZP resources can be utilized for channel measurement, along with one or more interference measurement resources that may be utilized for interference measurements. Interference measurement resources may include a zero-power (ZP) CSI-RS resource and an NZP CSI-RS resource with similar properties as the NZP CSI-RS resource utilized for channel measurement. In addition, each reference signal may include a number of pilots allocated within the respective channel measurement resource.

At 508, the scheduled entity 504 can estimate the downlink wireless channel from the reference signal(s). For example, the scheduled entity 504 may measure the SINR of one or more of the reference signals to obtain a downlink channel estimate of the downlink wireless channel.

At 510, the scheduled entity 504 may determine various CSI quantities from the downlink channel estimate. For example, the scheduled entity 504 may determine a RI, PMI, CQI, and SLI from the downlink channel estimate. The CQI may include an index (e.g., a CQI index) ranging, for example, from 0 to 15. The CQI index may indicate, for example, the highest MCS at which the Block Error Rate (BLER) of the channel does not exceed 10%. Once determined, the CSI quantities can be fed back. For example, at 512, the scheduled entity 504 may transmit a CSI report, including the determined CSI quantities to the scheduling entity 502.

The scheduling entity 502 and scheduled entity 504 may each support different types of CSI reports (including L1 measurement reports) and/or different types of measurements. For example, self-contained CSI (e.g., CSI is transmitted back to the scheduling entity 502 in the same slot as the CSI-RS is transmitted from the scheduling entity) or non-self-contained CSI (e.g., CSI is transmitted back to the scheduling entity 502 in a later slot than the slot in which the CSI-RS is transmitted from the scheduling entity) may be supported. To distinguish between the different report/measurement types and measurement configurations, CSI-RS pilots may be mapped to specific resource elements (REs) and ports for each of the report/measurement types and report/measurement configurations.

Figure 6:
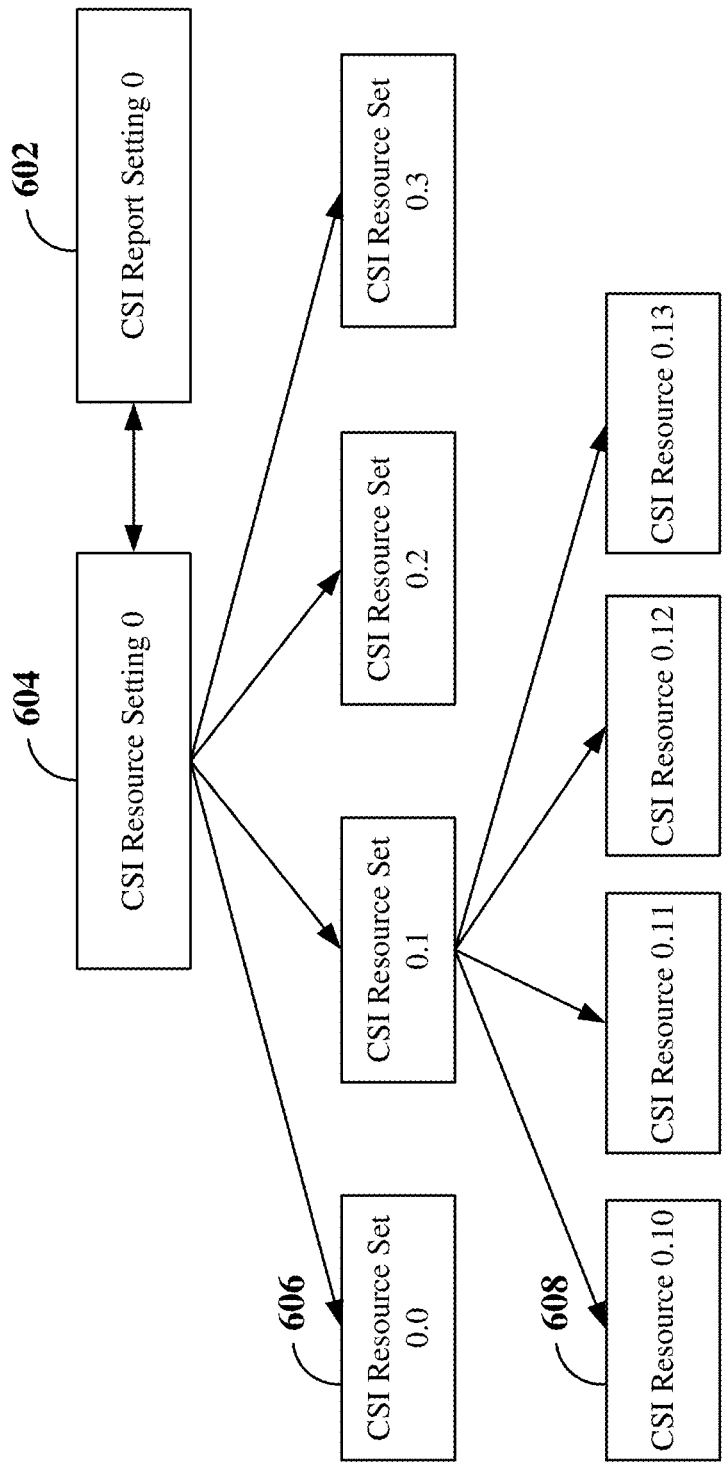
FIG. 6 is a diagram illustrating an example of channel state information (CSI) resource mapping according to some aspects.

FIG. 6 illustrates an exemplary CSI resource mapping to support different report/measurement configurations. The CSI resource mapping includes CSI report settings 602, CSI resource settings 604, CSI resource sets 606, and CSI resources 608. Each CSI resource setting 604 includes one or more CSI resource sets 606, and each CSI resource set 606 includes one or more CSI resources 608. In the example shown in FIG. 6, a single CSI resource setting (e.g., CSI Resource Setting 0) and a single CSI report setting (e.g., CSI Report Setting 0) are illustrated. However, it should be understood that any suitable number of CSI resource settings 604 and CSI report settings 602 may be supported.

Each CSI report setting 602 may include a reportQuantity that indicates, for example, the specific CSI quantities and granularity thereof (e.g., wideband/sub-band CQI, PMI, RI, LI, etc.), or L1 quantities (e.g., L1-RSRP, L1-SINR) to include in a CSI report. The CSI report setting 602 may further indicate a periodicity of the CSI report. For example, the CSI report setting 602 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 602 may further include a respective priority and other suitable parameters.

Each CSI report setting 602 may be linked to a CSI resource setting 604. Each CSI resource setting 604 may be associated with a particular time domain behavior of reference signals. For example, each CSI resource setting 604 may include periodic, semi-persistent, or aperiodic CSI resources 608. For periodic and semi-persistent CSI resource settings 604, the number of configured CSI resource sets 606 may be limited to one. In general, the CSI resource settings 604 that may be linked to a particular CSI report setting 602 may be limited by the time domain behavior of the CSI resource setting 604 and the CSI report setting 602. For example, an aperiodic CSI report setting 602 may be linked to periodic, semi-persistent, or aperiodic CSI resource settings 604. However, a semi-persistent CSI report setting 602 may be linked to only periodic or semi-persistent CSI resource settings 604. In addition, a periodic CSI report setting 602 may be linked to only a periodic CSI resource setting 604.

Each CSI resource set 606 may be associated with a CSI resource type. For example, CSI resource types may include non-zero-power (NZP) CSI-RS resources, SSB resources, or channel state information interference measurement (CSI-IM) resources. Thus, each CSI resource set 606 includes a list of CSI resources 608 of a particular CSI resource type. In addition, each CSI resource set 606 may further be associated with one or more of a set of frequency resources (e.g., a bandwidth and/or OFDM symbol(s) within a slot), a particular set of ports, a power, or other suitable parameters.

Each CSI resource 608 indicates the particular beam (e.g., ports), frequency resource, and OFDM symbol on which the reference signal may be measured by the wireless communication device. For example, each CSI resource 608 may indicate an RE on which a CSI-RS pilot or SSB transmitted from a particular set of ports (e.g., on a particular beam) may be measured. In the example shown in FIG. 6, CSI-RS resource set 0.1 includes four CSI-RS resources (CSI-RS resource 0.10, CSI-RS resource 0.11, CSI-RS resource 0.12, and CSI-RS resource 0.13). Each CSI resource 608 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

A scheduling entity may configure a scheduled entity with one or more CSI report settings 602 and CSI resource settings 604 via, for example, radio resource control (RRC) signaling. For example, the scheduling entity may configure the scheduled entity with a list of periodic CSI report settings 602 indicating the associated CSI resource set 606 that the scheduled entity may utilize to generate periodic CSI reports. As another example, the scheduling entity may configure the scheduled entity with a list of aperiodic CSI report settings in a CSI-AperiodicTriggerStateList. Each trigger state in the CSI-AperiodicTriggerStateList may include a list of aperiodic CSI report settings 602 indicating the associated CSI resource sets 606 for channel (and optionally interference) measurement. As another example, the scheduling entity may configure the scheduled entity with a list of semi-persistent CSI report settings in a CSI-SemiPersistentOnPUSCH-TriggerStateList. Each trigger state in the CSI-SemiPersistentOnPUSCH-TriggerStateList may include one CSI report setting 602 indicating the associated CSI resource set 606. The scheduling entity may then trigger one or more of the aperiodic or semi-persistent trigger states using, for example, DCI. As indicated above, a MAC-CE may be used to activate or deactivate a semi-persistent CSI report setting 602 for a CSI report sent on the PUCCH.

In current 5G NR systems, the CSI report setting(s) 602 and CSI resource setting(s) 604 for a scheduled entity are configured by the scheduling entity without input from the scheduled entity. As the number of features and processing capabilities of scheduled entities (e.g., UEs) continues to increase, UEs may be developed with advanced algorithms that enable channel prediction. For example, a UE may be capable of predicting CSI for future time slots and determining whether the predicted CSI represents a significant change in previously reported CSI using channel prediction algorithms. In addition, a UE may be capable of interpolating CSI between frequency bands or using downlink CSI to predict uplink CSI on the same or different frequency band. In such advanced use cases, a UE may benefit from a different CSI resource setting or a different CSI report setting. For example, the UE may be able to provide sufficient CSI using a reduced CSI resource configuration or reduced reporting periodicity.

Therefore, in various aspects of the disclosure, a UE may be configured to recommend a configuration of a CSI setting (e.g., a CSI report setting or CSI resource setting). In some examples, the recommendation may be based on changing channel conditions, capabilities of the UE (and base station), and/or performance factors associated with the UE. For example, a UE may be able to identify at least one parameter associated with a CSI setting and provide a recommendation to modify the CSI setting based on the at least one parameter to a base station. The recommendation may include, for example, an optimized configuration of the CSI setting or soft output, such as an uncertainty level or confidence level associated with the CSI setting. The base station may then select the optimized CSI setting based on the recommendation and provide the optimized CSI setting to the UE for use in generating and transmitting CSI reports to the base station.

Figure 7:
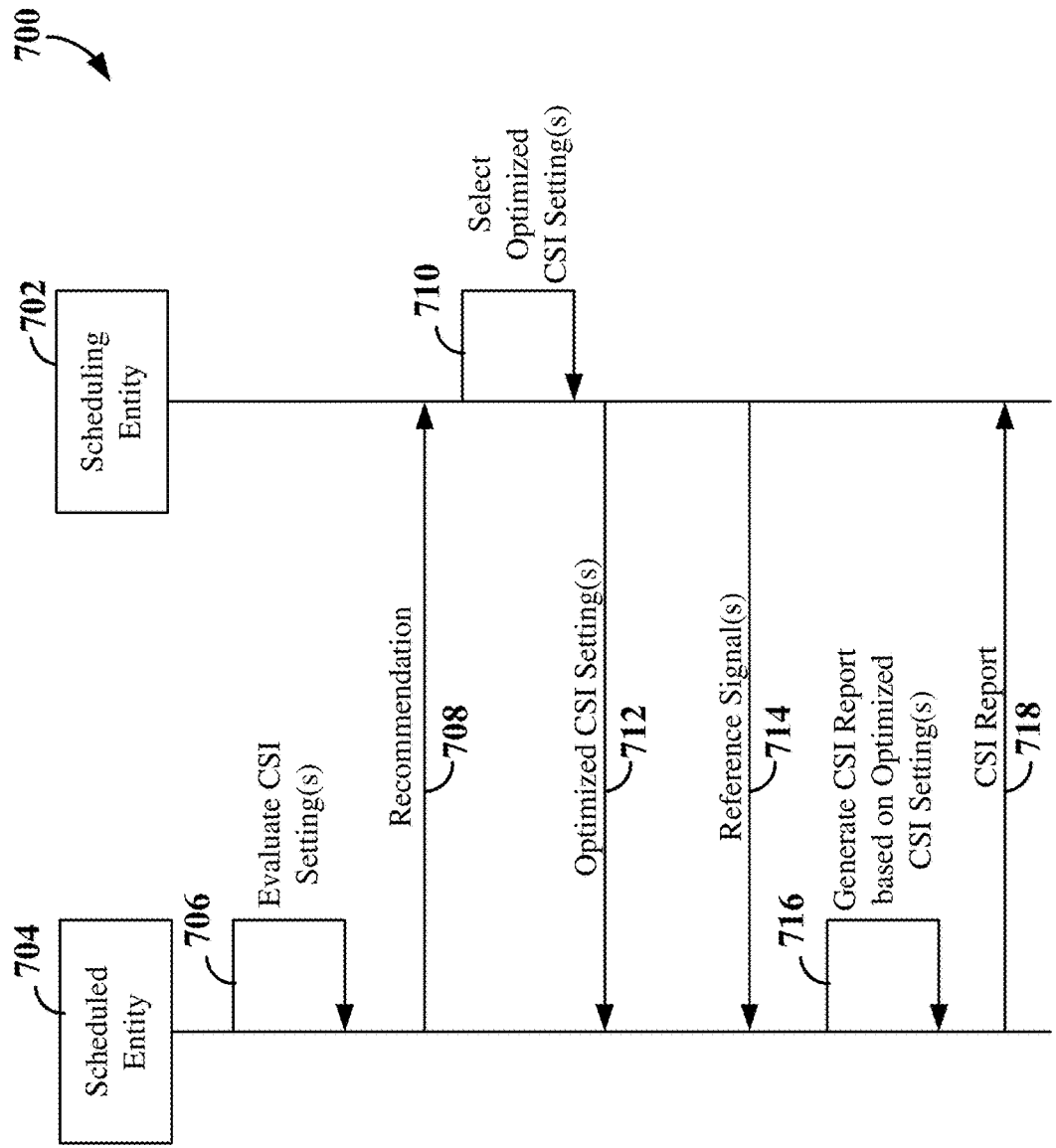
FIG. 7 is a signaling diagram illustrating exemplary signaling between a scheduling entity and a scheduled entity to provide recommended CSI settings according to some aspects.

FIG. 7 is a signaling diagram illustrating exemplary signaling between a scheduling entity 702 and a scheduled entity 704 to provide recommended CSI settings within a wireless network 700. In the illustrated scenario, the scheduled entity 704 can provide a CSI report to the scheduling entity 702 based on optimized CSI setting(s). The wireless network 700 may correspond, for example, to the RAN 104 or 200 shown in FIG. 1 or 2. The scheduling entity 702 may correspond, for example, to a base station (e.g., gNB or eNB) or other scheduling entity as shown in FIGS. 1, 2, and/or 5. The scheduled entity 704 may correspond, for example, to a UE or other scheduled node as shown in FIGS. 1, 2 and/or 5.

At 706, the scheduled entity 704 may perform an evaluation of one or more CSI settings (e.g., a CSI resource setting or CSI report setting) configured on the scheduled entity 704. The evaluation may be performed based on at least one of a channel between the scheduled entity 704 and the scheduling entity 702 (e.g., previous CSI reports, measured spectral efficiency, measured path loss, measured delay spread, etc.), a capability of the scheduled entity 704 (e.g., data-driven algorithms, such as machine learning (ML) algorithms, implemented on the scheduled entity), or a performance of the scheduled entity 704 (e.g., throughput, current amount of utilized computational resources, etc.).

For example, the scheduled entity 704 may be capable of predicting an amount of change in CSI over a future duration of time (e.g., one or more slots, subframes, frames, superframes, etc.) using at least one data-driven algorithm. The CSI change may be predicted, for example, based on one or more previous CSI reports, current measured channel parameters (e.g., spectral efficiency, path loss, delay spread, etc.), a mobility of the scheduled entity (e.g., the time-varying nature of the channel), environmental factors, and/or other relevant and available information. Based on the predicted CSI change, the scheduled entity 704 may determine whether the current CSI setting can be further optimized. For example, if the periodicity of CSI reporting is insufficient, the throughput of the scheduled entity 704 may be adversely affected. In addition, if the periodicity of CSI reporting is high, the scheduled entity 704 may suffer from a loss in transmission resources and excessive consumption of computational resources. Therefore, the scheduled entity 704 may determine that the throughput may be improved from a higher CSI report periodicity or that additional transmission resources or computational resources may be gained without a loss in throughput from a lower CSI report periodicity.

As another example, the scheduled entity 704 may be capable of using the CSI generated for one or more frequency bands to interpolate or predict the CSI in one or more other frequency bands using at least one data-driven algorithm. Based on this capability, the scheduled entity 704 may determine whether the current CSI setting can be further optimized. For example, the scheduled entity 704 may determine that the CSI resource setting may be optimized by removing one or more CSI resource sets from the CSI resource setting, including different or additional resources in a particular CSI resource set, and/or including one or more additional CSI resource sets in the CSI resource setting.

The scheduled entity 704 may then utilize the results of the evaluation to generate at least one parameter related to the CSI setting(s). In some examples, the at least one parameter may include an optimized configuration of the current CSI setting. For example, the optimized configuration of the CSI setting may include a respective optimized configuration of at least one of a CSI report periodicity, a CSI report type, a CSI report quantity (e.g., CQI, PMI, RI, SLI, L1 measurement, etc.), a CSI report frequency granularity, or a CSI resource set. For example, the optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter may include soft output, such as an uncertainty level or confidence level associated with the current CSI setting. The uncertainty level or confidence level may indicate whether the CSI setting can be further optimized.

At 708, the scheduled entity 704 may transmit a recommendation to modify the CSI setting(s) based on the at least one parameter to the scheduling entity 702. In some examples, the recommendation includes the at least one parameter. For example, the recommendation can include the optimized configuration of the CSI setting or the soft output (e.g., uncertainty level or confidence level). In some examples, the recommendation may be transmitted to the scheduling entity 702 within, for example, a radio resource control (RRC) message, a medium access control (MAC) control element (MAC-CE), or uplink control information (UCI). In other examples, the recommendation may included within a CSI report (e.g., an initial CSI report generated based on the current CSI setting) transmitted to the scheduling entity.

At 710, the scheduling entity 702 may select one or more optimized CSI settings based on the recommendation. In some examples, the recommendation includes the optimized configuration of the CSI setting. In this example, the scheduling entity can select the optimized CSI setting corresponding to the optimized configuration. For example, the scheduling entity 702 may select a different CSI setting that includes the optimized configuration or adjust the current CSI setting to include the optimized configuration. In some examples, the recommendation includes the uncertainty level or confidence level associated with the current CSI setting. In this example, the scheduling entity 702 can select the optimized CSI setting that accommodates the uncertainty level or confidence level. For example, the scheduling entity may select a different CSI setting or adjust the current CSI setting to accommodate the uncertainty level or confidence level.

At 712, the scheduling entity 702 may transmit the optimized CSI setting to the scheduled entity 704. In some examples, the scheduling entity 702 may transmit the optimized CSI setting to the scheduled entity 704 within an RRC reconfiguration message. In other examples, the scheduling entity 702 may trigger the optimized CSI setting via a MAC-CE or downlink control information (DCI).

At 714, the scheduling entity 702 may transmit one or more reference signal(s), such as CSI-RSs, to the scheduled entity 704 in accordance with the optimized CSI setting(s). At 716, the scheduled entity 704 may generate a CSI report from the received reference signal(s) based on the optimized CSI setting(s). For example, the scheduled entity 704 may measure the SINR of one or more of the reference signals to obtain a downlink channel estimate of the downlink wireless channel and determine various CSI quantities from the downlink channel estimate. For example, the scheduled entity 504 may determine a RI, PMI, CQI, SLI, and/or L1 measurements from the downlink channel estimate. At 718, the scheduled entity 704 may then transmit the CSI report, including the determined CSI quantities, to the scheduling entity 702.

Figure 8:
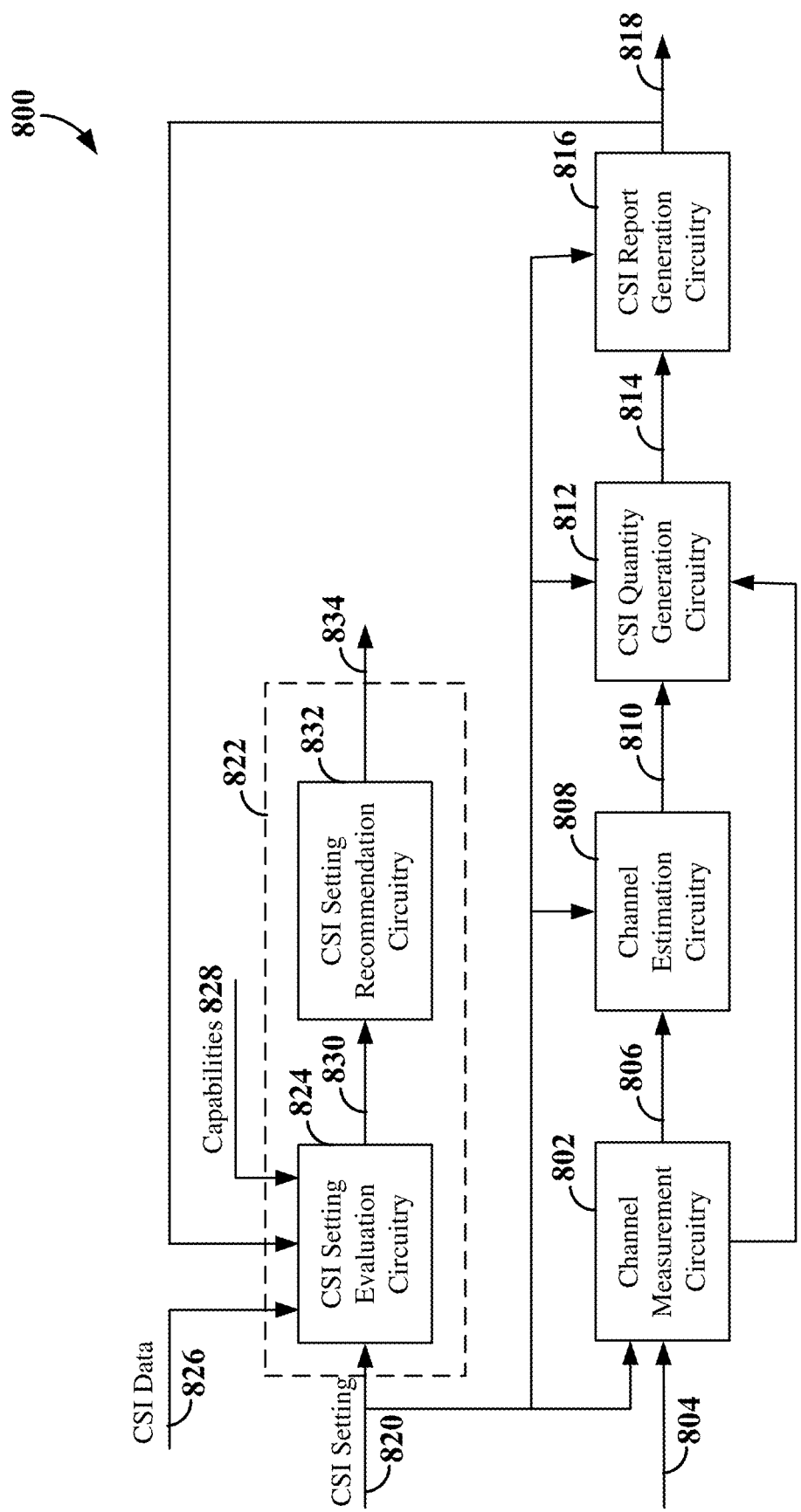
FIG. 8 is a block diagram illustrating exemplary processing circuitry of a scheduled entity according to some aspects.

FIG. 8 is a block diagram illustrating exemplary processing circuitry 800 of a scheduled entity according to some aspects. The scheduled entity may correspond to a UE or other scheduled entity, as shown in FIGS. 1, 2, 5, and/or 7. The processing circuitry 800 includes channel measurement circuitry 802, channel estimation circuitry 808, CSI quantity generation circuitry 812, CSI report generation circuitry 816, and CSI optimization circuitry 822.

The channel measurement circuitry 802 is configured to measure one or more reference signals 804 transmitted from a scheduling entity (e.g., a base station, such as a gNB or eNB, or other scheduling entity) to produce reference signal measurements 806. The reference signal measurements 806 can include, for example, the measured SINR and/or RSRP of each of the reference signals. For example, the one or more reference signals may be transmitted within one or more channel measurement resources and/or one or more interference measurement resources. As an example, the channel measurement resources may include a NZP CSI-RS resource that may be utilized for channel measurement. In addition, the interference measurement resources may include a ZP CSI-RS and an NZP CSI-RS with similar properties as the NZP CSI-RS utilized for channel measurement. The channel measurement resource(s) and interference measurement resource(s) may be determined based on one or more current CSI setting(s) 820 configured on the scheduled entity by the scheduling entity. The current CSI setting(s) 820 may include, for example, one or more CSI report settings and/or one or more CSI resource settings.

The channel estimation circuitry 808 is configured to utilize the one or more reference signal measurements 806 to estimate a channel between the scheduled entity and the scheduling entity and produce a channel estimate 810. For example, the channel estimate 810 may include a vector $\{h_k\}_{k=1}^{K}$, where K is the number of allocated pilots in the allocated resource (e.g., channel measurement resource), k is the index of the pilot, and $h_k$ is the channel response coefficient at pilot k. In some examples, the channel response coefficients may be selected from preconfigured values based on one or more estimated parameters, such as the signal-to-noise ratio (SNR), Doppler, delay spread, and/or other suitable parameters, which may be estimated using a tracking reference signal (TRS) or PDSCH. The channel estimate 810 may include a wideband channel estimate, a sub-band channel estimate, or a combination thereof. In addition, a respective channel estimate 810 may obtained for each measured layer. The number and configuration of channel estimate(s) 810 may be determined based on, for example, the current CSI setting(s) 820.

The CSI quantity generation circuitry 812 is configured to generate one or more CSI report quantities (e.g., CQI, RI, PMI, SLI, and/or L1 measurements) 814 based on the channel estimate 810 and/or the reference signal measurements 806. The particular CSI report quantities 814 to generate may be determined, for example, based on the current CSI setting(s) 820. For example, the CSI quantity generation circuitry 812 may directly obtain the L1 measurements from the SINR or RSRP reference signal measurements 806. As another example, the CSI quantity generation circuitry 812 may determine the CQI, PMI, RI, and SLI from at least the channel estimate 810.

The CSI report generation circuitry 816 is configured to generate a CSI report 818 including the CSI report quantities 814 for transmission to a scheduling entity. The CSI report generation circuitry 816 may determine a configuration of the CSI report 818 (e.g., periodicity, report type, report frequency granularity, other parameters to include, etc.) based on, for example, the current CSI setting(s) 820.

The CSI optimization circuitry 822 includes CSI setting evaluation circuitry 824 and CSI setting recommendation circuitry 832. The CSI setting evaluation circuitry 824 is configured to evaluate at least one of the current CSI setting(s) 820 (e.g., one or more CSI report settings and/or one or more CSI resource settings) and to provide at least one parameter 830 associated with the current CSI setting(s) 820 to the CSI setting recommendation circuitry 832. The CSI setting evaluation circuitry 824 may evaluate the current CSI setting(s) using one or more of previously generated CSI report(s) 818, CSI data 826, and capabilities 828 of the scheduled entity. The CSI data 826 may include, for example, channel conditions (e.g., the measured spectral efficiency, path loss, delay spread, etc.), performance of the scheduled entity (e.g., throughput, current amount of utilized computation resources, etc.), and other suitable CSI-related data. The capabilities 828 of the scheduled entity may include, for example, a list of data-driven algorithms, such as ML algorithms, implemented on the scheduled entity.

The CSI setting evaluation circuitry 824 may then utilize the results of the evaluation to generate the at least one parameter 830 related to the CSI setting(s). In some examples, the at least one parameter 830 may include an optimized configuration of the current CSI setting. For example, the optimized configuration of the CSI setting may include a respective optimized configuration of at least one of a CSI report periodicity, a CSI report type, a CSI report quantity (e.g., CQI, PMI, RI, SLI, L1 measurement, etc.), a CSI report frequency granularity, or a CSI resource set. For example, the optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter 830 may include soft output, such as an uncertainty level or confidence level associated with the current CSI setting. The uncertainty level or confidence level may indicate whether the CSI setting can be further optimized.

The CSI setting recommendation circuitry 832 is configured to generate a recommendation 834 to modify the current CSI setting(s) 820 based on the at least one parameter 830. In some examples, the recommendation 834 can include the at least one parameter 830. For example, the recommendation 834 can include the optimized configuration of the CSI setting or the soft output (e.g., uncertainty level or confidence level). The recommendation 834 may further be transmitted to a scheduling entity to update the CSI setting(s) 820 with optimized CSI setting(s) selected by the scheduling entity based on the recommendation.

Figure 9:
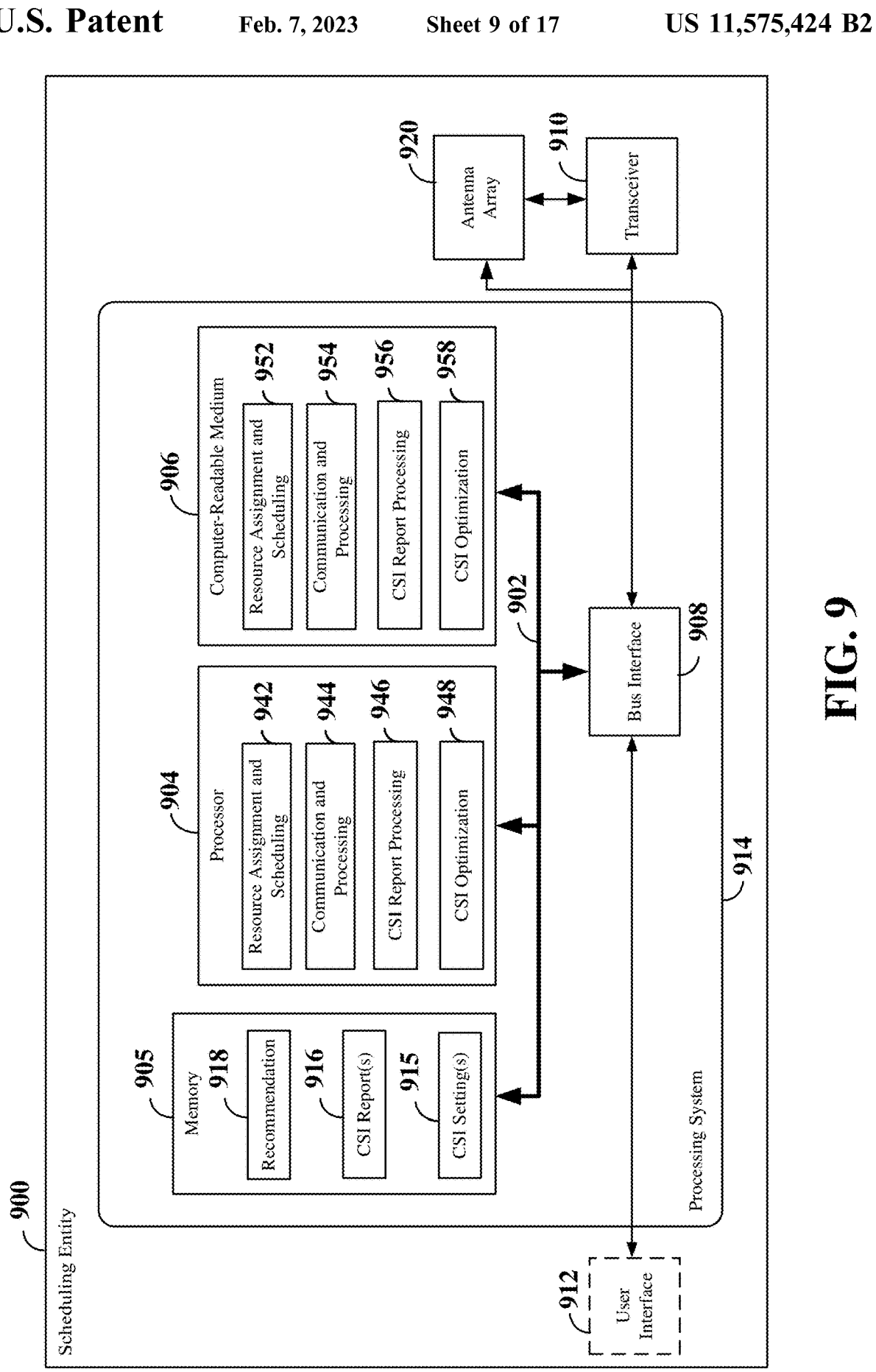
FIG. 9 is a block diagram illustrating an example of a hardware implementation for a scheduling entity employing a processing system according to some aspects.

FIG. 9 is a conceptual diagram illustrating an example of a hardware implementation for an exemplary scheduling entity 900 employing a processing system 914. For example, the scheduling entity 900 may be a base station (e.g., gNB or eNB) or other scheduling entity as illustrated in any one or more of FIGS. 1, 2, 5, and/or 7.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes described below. The processor 904 may in some instances be implemented via a baseband or modem chip and in other implementations, the processor 904 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). The bus interface 908 further provides an interface between the bus 902 and one or more antenna array(s) 920 (e.g., antenna panels). A user interface 912 (e.g., keypad, display, touchscreen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. In some examples, the computer-readable medium 906 may be part of the memory 905. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include resource assignment and scheduling circuitry 942, configured to generate, schedule, and modify a resource assignment or grant of time-frequency resources. For example, the resource assignment and scheduling circuitry 942 may schedule time-frequency resources within a plurality of sub-bands or BWPs of one or more subframes or slots to carry user data traffic and/or control information to and/or from multiple scheduled entities.

In various aspects of the present disclosure, the resource assignment and scheduling circuitry 942 may be configured to identify one or more CSI settings 915 (e.g., CSI report settings and/or CSI resource settings) configured for a scheduled entity. The CSI setting(s) 915 may be stored, for example, in memory 905. The CSI setting(s) 915 may indicate a set of CSI-RS ports and a set of downlink resources (e.g., resource elements (REs)) on which reference signals (e.g., CSI-RSs and/or SSBs) may be transmitted to the scheduled entity. The resource assignment and scheduling circuitry 942 may further be configured to schedule one or more reference signals (e.g., CSI-RSs and/or SSBs) to be transmitted to the scheduled entity on the set of downlink resources and set of ports indicated in the CSI setting(s) 915.

In addition, the resource assignment and scheduling circuitry 942 may further schedule uplink REs on which the scheduled entity may transmit a CSI report 916 in response to receiving and measuring the reference signals. The resource assignment and scheduling circuitry 942 may further be configured to schedule resources for transmitting the CSI setting(s) 915 configured for the scheduled entity to the scheduled entity. For example, the resource assignment and scheduling circuitry 942 may be configured to schedule resources for transmitting an RRC message including the CSI setting(s) 915 to the scheduled entity. The resource assignment and scheduling circuitry 942 may further be configured to schedule resources for transmitting a MAC-CE or DCI to the scheduled entity to activate or trigger one or more CSI setting(s) 915 on the scheduled entity.

The resource assignment and scheduling circuitry 942 may further be configured to schedule resources for receiving a recommendation 918 to modify the CSI setting(s) 915 from the scheduled entity. In addition, the resource assignment and scheduling circuitry 942 may be configured to schedule resources to transmit an optimized CSI setting (e.g., updated CSI setting(s) 915) to the scheduled entity. The resource assignment and scheduling circuitry 942 may further be configured to schedule resources for receiving a capability of the scheduled entity to provide the recommendation, to receive at least one metric from the scheduled entity associated with the capability, and/or to transmit at least one data-driven algorithm to the scheduled entity for use in generating the recommendation. The resource assignment and scheduling circuitry 942 may further be configured to execute resource assignment and scheduling software 952 stored in the computer-readable medium 906 to implement one or more of the functions described herein.

The processor 904 may further include communication and processing circuitry 944 configured to communicate with one or more scheduled entities over a carrier frequency. In some examples, the communication and processing circuitry 944 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 944 may be configured to transmit the CSI setting(s) 915 to the corresponding scheduled entity via, for example, semi-static RRC signaling. In addition, the communication and processing circuitry 944 may be configured to transmit a MAC-CE or DCI to activate or trigger a CSI setting 915 on the scheduled entity. The communication and processing circuitry 944 may further be configured to generate and transmit reference signals (e.g., CSI-RSs and/or SSBs) to the scheduled entity on the set of CSI-RS ports and REs scheduled by the resource assignment and scheduling circuitry 942. For example, the communication and processing circuitry 944 may be configured to generate and transmit each CSI-RS on a respective beam corresponding to the respective CSI-RS port via the transceiver 910 and an antenna array 920. The communication and processing circuitry 944 may further be configured to receive the CSI report 916 from the scheduled entity. The CSI report 916 may be stored, for example, in memory 905 for further processing.

The communication and processing circuitry 944 may further be configured to receive the recommendation to modify the CSI setting(s) 915 from the scheduled entity. The recommendation may be received, for example, within an RRC message, a MAC-CE, or UCI. In addition, the communication and processing circuitry 944 may be configured to transmit the optimized CSI setting 915 to the scheduled entity. For example, the optimized CSI setting 915 may be transmitted within an RRC reconfiguration message. The communication and processing circuitry 944 may further be configured to trigger or activate the optimized CSI setting via a MAC-CE or DCI. The communication and processing circuitry 944 may further be configured to receive a capability of the scheduled entity to provide the recommendation, receive at least one metric from the scheduled entity associated with the capability, and/or transmit at least one data-driven algorithm to the scheduled entity for use in generating the recommendation. The communication and processing circuitry 944 may further be configured to execute communication and processing software 954 stored in the computer-readable medium 906 to implement one or more of the functions described herein.

The processor 904 may further include CSI report processing circuitry 946, configured to process CSI reports 916 received from the scheduled entity. In some examples, each CSI report 916 received from the scheduled entity may include respective CSI report quantities for one or more CSI report parameters (e.g., CQI, PMI, RI, SLI, L1-RSRP, or L1-SINR) based on the CSI setting(s) 915 configured for the scheduled entity. The CQI may include a wideband CQI value and/or multiple sub-band CQI values, each including modulation and coding scheme (MCS) information (e.g., an MCS index). The CSI report processing circuitry 946 may further be configured to determine a respective rank, MCS, precoding matrix, and serving beam(s) for downlink transmissions to the scheduled entity based on the CSI report 916.

The resource assignment and scheduling circuitry 942 may then utilize the respective rank, MCS, precoding matrix, and serving beam(s) to schedule time-frequency resources (e.g., REs) within one or more sub-bands of a subframe or slot for the scheduled entity. In some examples, the resource assignment and scheduling circuitry 942 may schedule a number of traffic streams (corresponding to the rank) to be spatially multiplexed to the scheduled entity in one or more sub-bands of a subframe or slot. In some examples, the CSI report 916 may further include the recommendation 918 to modify the CSI setting(s) 915. The CSI report processing circuitry 946 may further be configured to execute CSI report processing software 956 stored in the computer-readable medium 906 to implement one or more of the functions described herein.

The processor 904 may further include CSI optimization circuitry 948, configured to optimize one or more CSI setting(s) 915 configured for the scheduled entity based on the recommendation 918 to modify the CSI setting(s) received from the scheduled entity. The CSI optimization circuitry 948 may further be configured to store the optimized CSI setting(s) 915 within, for example, memory 905 and to transmit the optimized CSI setting(s) 915 to the scheduled entity via the communication and processing circuitry 944.

In some examples, the recommendation 918 includes at least one parameter associated with the CSI setting(s) 915. The at least one parameter can include an optimized configuration of the CSI setting(s) 915. The CSI optimization circuitry 948 may be configured to identify the optimized CSI setting(s) 915 including the optimized configuration. For example, the optimized configuration of the CSI setting(s) 915 may include a respective optimized configuration of at least one of a CSI report type, a CSI report periodicity, a CSI resource set, a CSI report quantity, or a CSI report frequency granularity. In an example, the respective optimized configuration of the CSI resource set includes at least one of an optimized resource configuration of resources within the CSI resource set, additional resources to include in at least the CSI resource set, or one or more additional CSI resource sets including the CSI resource set. The at least one parameter can further include an uncertainty level or confidence level associated with the CSI setting(s) 915. The CSI optimization circuitry 948 may be configured to identify the optimized CSI setting(s) 915 that accommodates the uncertainty level or the confidence level.

The CSI optimization circuitry 948 may further be configured to receive a capability of the scheduled entity to provide the recommendation 918 to modify the CSI setting(s) 915. For example, the scheduled entity may indicate its capability to provide the recommendation 918 in one or more scenarios. In some examples, the scheduled entity may indicate its capability to predict CSI for future time slots, determine whether the predicted CSI represents a significant change with respect to previously reported CSI using channel prediction algorithms, interpolate CSI between frequency bands, or use downlink CSI to predict uplink CSI on the same or different frequency band. The capability indication may further be granular (e.g., the scheduled entity may be able to predict in only certain frequency bands or within a certain bandwidth). The CSI optimization circuitry 948 may utilize the capability indication in selecting the optimized CSI setting(s) 915 for the scheduled entity.

As another example, the scheduled entity may indicate its capability to provide the recommendation by providing at least one metric associated with the capability. For example, the scheduled entity may indicate its capability to perform advanced algorithms by including the number of multiplications per second, memory capacity, and other suitable processing capabilities of the scheduled entity. In this example, the CSI optimization circuitry 948 may be configured to identify at least one data-driven algorithm based on the at least one metric and to transmit the at least one data-driven algorithm to the scheduled entity for use in identifying the at least one parameter and generating the recommendation 918. The CSI optimization circuitry 948 may be configured to execute CSI optimization software 958 stored in the computer-readable medium 906 to implement one or more of the functions described herein.

Figure 10:
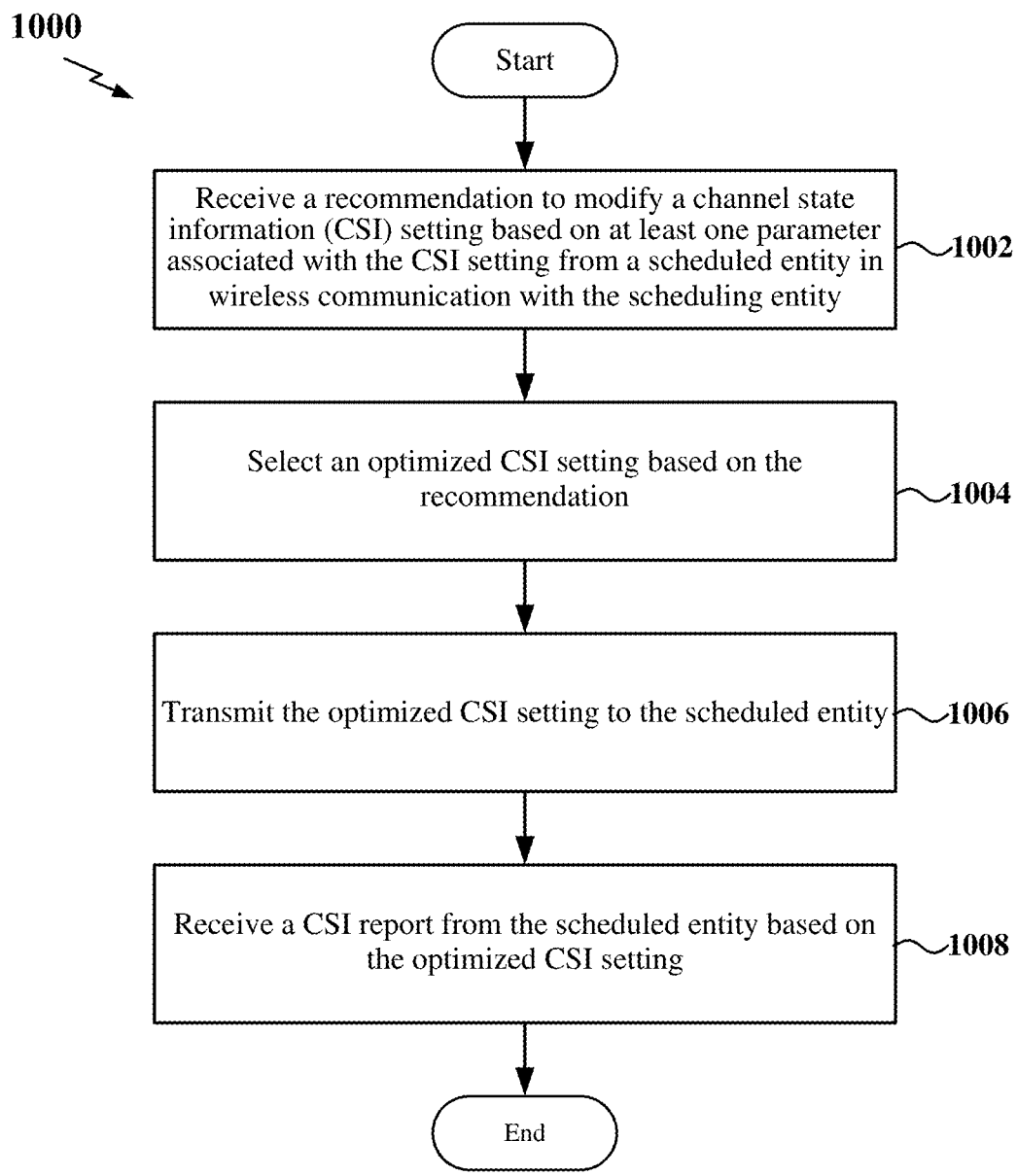
FIG. 10 is a flow chart of an exemplary method for a scheduling entity to optimize a CSI setting for a scheduled entity according to some aspects.

FIG. 10 is a flow chart 1000 of a method for a scheduling entity to optimize a CSI setting for a scheduled entity according to some aspects. As described below, some or all illustrated features may be omitted in a particular implementation within the scope of the present disclosure, and some illustrated features may not be required for implementation of all embodiments. In some examples, the method may be performed by the scheduling entity 900, as described above and illustrated in FIG. 9, by a processor or processing system, or by any suitable means for carrying out the described functions.

At block 1002, the scheduling entity may receive a recommendation to modify a channel state information (CSI) setting (e.g., a CSI report setting or CSI resource setting) based on at least one parameter associated with the CSI setting from a scheduled entity in wireless communication with the scheduling entity. For example, the recommendation may be received within an RRC message, a MAC-CE, UCI, or as part of an initial CSI report generated based on current CSI setting(s).

In some examples, the recommendation includes the at least one parameter. In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter may include an uncertainty level or confidence level associated with the CSI setting. For example, the CSI optimization circuitry 948, together with the communication and processing circuitry 944 and transceiver 910, shown and described above in connection with FIG. 9 may receive the recommendation to modify the CSI setting from the scheduled entity.

At block 1004, the scheduling entity may select an optimized CSI setting based on the recommendation. In some examples, the scheduling entity may identify the optimized CSI setting that includes the optimized configuration included in the recommendation. In other examples, the scheduling entity may identify the optimized CSI setting that accommodates the uncertainty level or the confidence level. For example, the CSI optimization circuitry 948 shown and described above in connection with FIG. 9 may select the optimized CSI setting.

At block 1006, the scheduling entity may transmit the optimized CSI setting to the scheduled entity. For example, the scheduling entity may transmit the optimized CSI setting to the scheduled entity within an RRC reconfiguration message. The scheduling entity may further trigger the optimized CSI setting via a MAC-CE or DCI. For example, the communication and processing circuitry 944 and transceiver 910 shown and described above in connection with FIG. 9 may transmit the optimized CSI setting to the scheduled entity.

At block 1008, the scheduling entity may receive a CSI report from the scheduled entity based on the optimized CSI setting. In some examples, the CSI report received from the scheduled entity may include respective CSI report quantities for one or more CSI report parameters (e.g., CQI, PMI, RI, SLI, L1-RSRP, or L1-SINR) based on the optimized CSI setting configured for the scheduled entity. For example, the CSI report processing circuitry 946, together with the communication and processing circuitry 944 and transceiver 910, shown and described above in connection with FIG. 9 may receive the CSI report.

Figure 11:
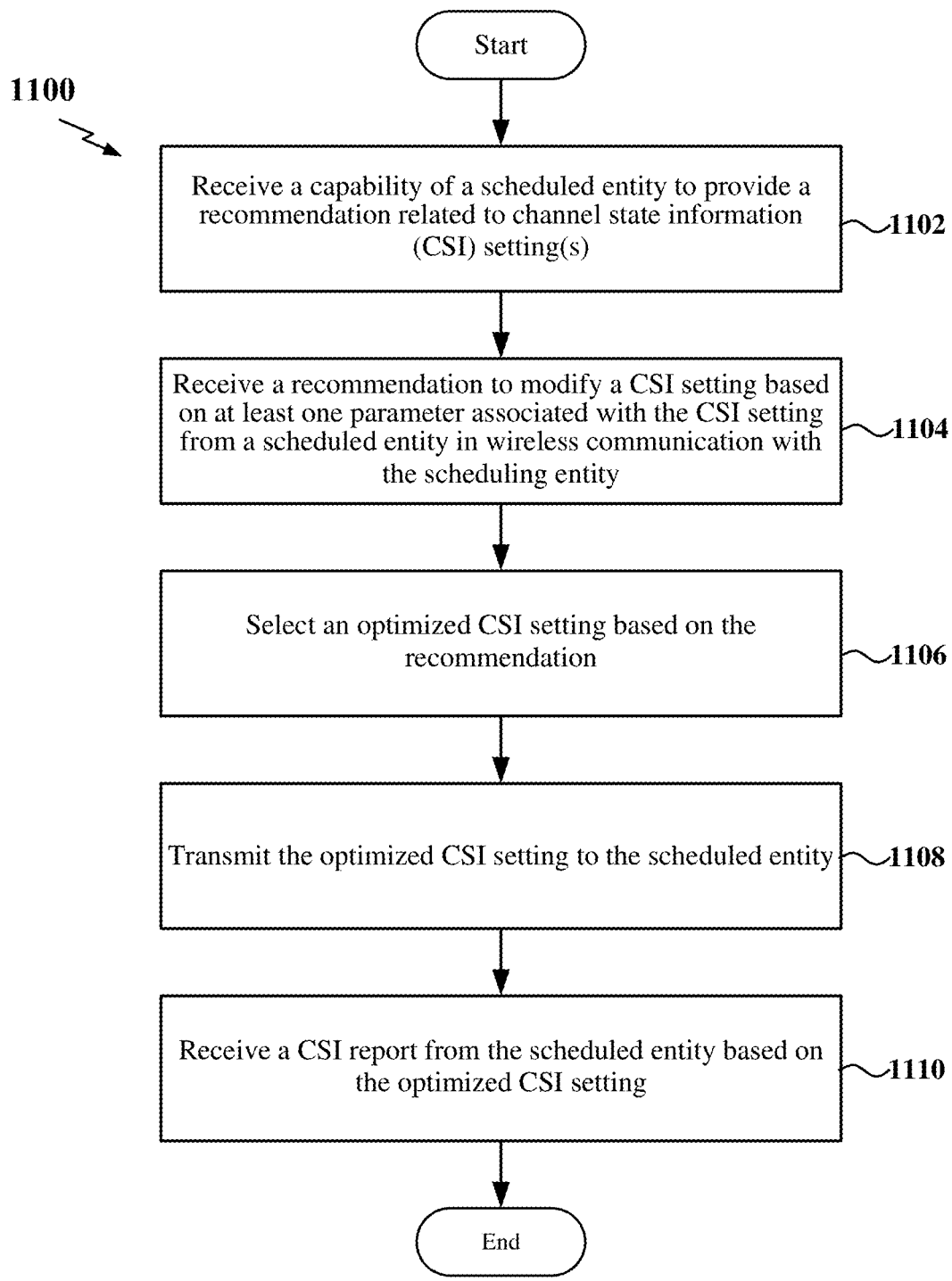
FIG. 11 is a flow chart of another exemplary method for a scheduling entity to optimize a CSI setting for a scheduled entity according to some aspects.

FIG. 11 is a flow chart 1100 of another method for a scheduling entity to optimize a CSI setting for a scheduled entity according to some aspects. As described below, some or all illustrated features may be omitted in a particular implementation within the scope of the present disclosure, and some illustrated features may not be required for implementation of all embodiments. In some examples, the method may be performed by the scheduling entity 900, as described above and illustrated in FIG. 9, by a processor or processing system, or by any suitable means for carrying out the described functions.

At block 1102, the scheduling entity may receive a capability of a scheduled entity to provide a recommendation related to channel state information (CSI) setting(s) (e.g., CSI report settings and/or CSI resource settings). For example, the scheduled entity may indicate its capability to provide the recommendation using one or more data-driven algorithms implemented on the scheduled entity. In some examples, the scheduled entity may indicate its capability to predict CSI for future time slots, determine whether the predicted CSI represents a significant change with respect to previously reported CSI using channel prediction algorithms, interpolate CSI between frequency bands, or use downlink CSI to predict uplink CSI on the same or different frequency band. The capability indication may further be granular (e.g., the scheduled entity may be able to predict in only certain frequency bands or within a certain bandwidth). For example, the CSI optimization circuitry 948, together with the communication and processing circuitry 944 and transceiver 910, shown and described above in connection with FIG. 9 may receive the capability of the scheduled entity to provide the recommendation.

At block 1104, the scheduling entity may receive a recommendation to modify a CSI setting based on at least one parameter associated with the CSI setting from a scheduled entity in wireless communication with the scheduling entity. For example, the recommendation may be received within an RRC message, a MAC-CE, UCI, or as part of an initial CSI report generated based on current CSI setting(s).

In some examples, the recommendation includes the at least one parameter. In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter may include an uncertainty level or confidence level associated with the CSI setting. For example, the CSI optimization circuitry 948, together with the communication and processing circuitry 944 and transceiver 910, shown and described above in connection with FIG. 9 may receive the recommendation to modify the CSI setting from the scheduled entity.

At block 1106, the scheduling entity may select an optimized CSI setting based on the recommendation. In some examples, the scheduling entity may identify the optimized CSI setting that includes the optimized configuration included in the recommendation. In other examples, the scheduling entity may identify the optimized CSI setting that accommodates the uncertainty level or the confidence level. The scheduling entity may further utilize the capability of the scheduled entity in selecting the optimized CSI setting. For example, the CSI optimization circuitry 948 shown and described above in connection with FIG. 9 may select the optimized CSI setting.

At block 1108, the scheduling entity may transmit the optimized CSI setting to the scheduled entity. For example, the scheduling entity may transmit the optimized CSI setting to the scheduled entity within an RRC reconfiguration message. The scheduling entity may further trigger the optimized CSI setting via a MAC-CE or DCI. For example, the communication and processing circuitry 944 and transceiver 910 shown and described above in connection with FIG. 9 may transmit the optimized CSI setting to the scheduled entity.

At block 1110, the scheduling entity may receive a CSI report from the scheduled entity based on the optimized CSI setting. In some examples, the CSI report received from the scheduled entity may include respective CSI report quantities for one or more CSI report parameters (e.g., CQI, PMI, RI, SLI, L1-RSRP, or L1-SINR) based on the optimized CSI setting configured for the scheduled entity. For example, the CSI report processing circuitry 946, together with the communication and processing circuitry 944 and transceiver 910, shown and described above in connection with FIG. 9 may receive the CSI report.

Figure 12:
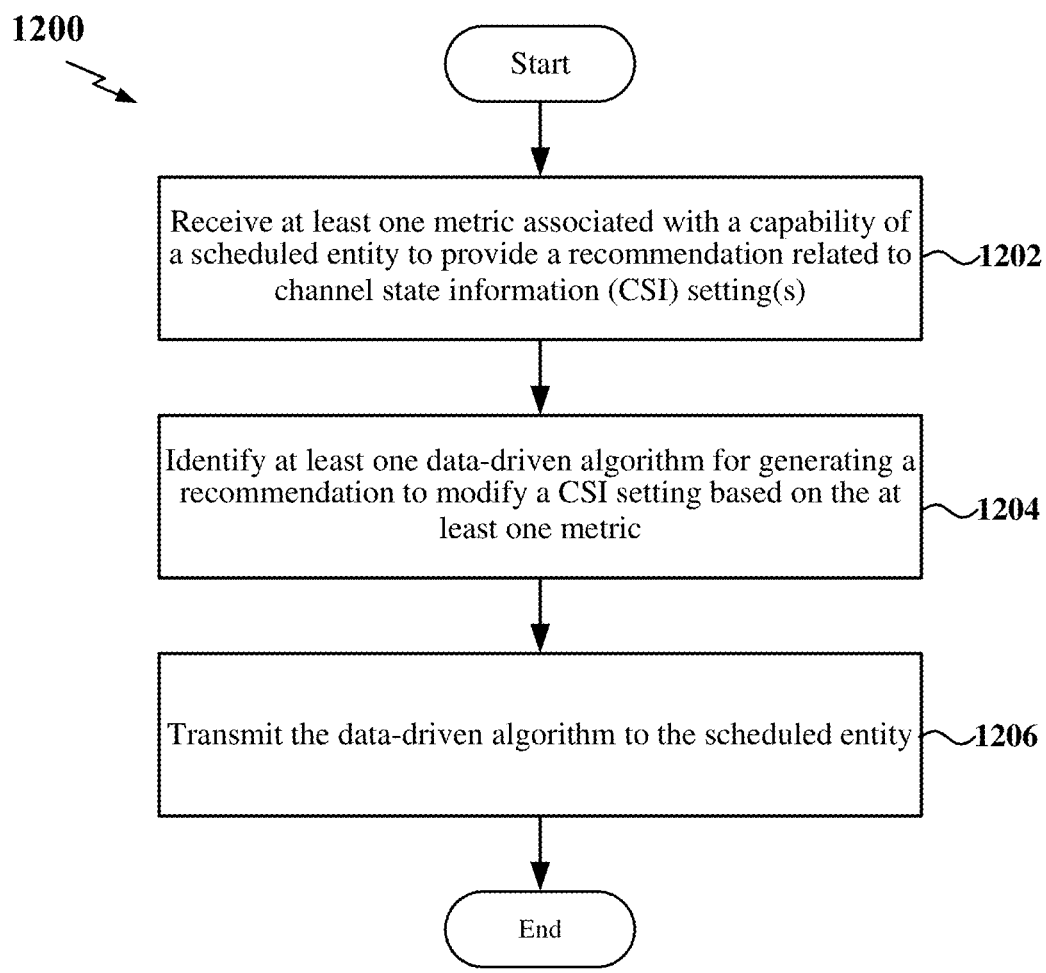
FIG. 12 is a flow chart of another exemplary method for a scheduling entity to optimize a CSI setting for a scheduled entity according to some aspects.

FIG. 12 is a flow chart 1200 of another method for a scheduling entity to optimize a CSI setting for a scheduled entity according to some aspects. As described below, some or all illustrated features may be omitted in a particular implementation within the scope of the present disclosure, and some illustrated features may not be required for implementation of all embodiments. In some examples, the method may be performed by the scheduling entity 900, as described above and illustrated in FIG. 9, by a processor or processing system, or by any suitable means for carrying out the described functions.

At block 1202, the scheduling entity may receive at least one metric associated with a capability of a scheduled entity to provide a recommendation related to channel state information (CSI) setting(s) (e.g., CSI report settings and/or CSI resource settings). For example, the scheduled entity may indicate its capability to perform advanced algorithms by including the number of multiplications per second, memory capacity, and other suitable processing capabilities of the scheduled entity. For example, the CSI optimization circuitry 948, together with the communication and processing circuitry 944 and transceiver 910, shown and described above in connection with FIG. 9 may receive the at least one metric from the scheduled entity.

At block 1204, the scheduling entity may identify at least one data-driven algorithm for generating a recommendation to modify a CSI setting based on the at least one metric. For example, the CSI optimization circuitry 948 shown and described above in connection with FIG. 9 may identify the at least one data-driven algorithm based on the at least one metric.

At block 1206, the scheduling entity may transmit the at least one data-driven algorithm to the scheduled entity. The scheduled entity may utilize the at least one data-driven algorithm to identify at least one parameter associated with the CSI setting and to generate the recommendation to modify the CSI setting based on the at least one parameter. For example, the CSI optimization circuitry 948, together with the communication and processing circuitry 944 and transceiver, shown and described above in connection with FIG. 9 may transmit the at least one data-driven algorithm to the scheduled entity.

In one configuration, the scheduling entity 900 includes means for performing the various functions and processes described in relation to FIGS. 10-12. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 4, 5, and/or 7, and utilizing, for example, the processes and/or algorithms described herein in relation to FIGS. 10-12.

The processes shown in FIGS. 10-12 may include additional aspects, such as any single aspect or any combination of aspects described below and/or in connection with one or more other processes described elsewhere herein.

In a first aspect, a scheduling entity (e.g., a base station) in a wireless communication network may receive a recommendation to modify a channel state information (CSI) setting based on at least one parameter associated with the CSI setting from a scheduled entity in wireless communication with the scheduling entity. The scheduling entity may further select an optimized CSI setting based on the recommendation, transmit the optimized CSI setting to the scheduled entity, and receive a CSI report from the scheduled entity based on the optimized CSI setting.

In a second aspect, alone or in combination with the first aspect, the recommendation includes the at least one parameter and the at least one parameter includes an optimized configuration of the CSI setting. In addition, the scheduling entity may identify the optimized CSI setting including the optimized configuration.

In a third aspect, alone or in combination with one or more of the first and second aspects, the optimized configuration of the CSI setting includes a respective optimized configuration of at least one of a CSI report type, a CSI report periodicity, a CSI resource set, a CSI report quantity, or a CSI report frequency granularity.

In a fourth aspect, alone or in combination with one or more of the first through third aspects, the respective optimized configuration of the CSI resource set includes at least one of an optimized resource configuration of resources within the CSI resource set, additional resources to include in at least the CSI resource set, or one or more additional CSI resource sets including the CSI resource set.

In a fifth aspect, alone or in combination with one or more of the first through fourth aspects, the recommendation includes the at least one parameter and the at the least one parameter includes an uncertainty level or a confidence level associated with the CSI setting. In addition, the scheduling entity may identify the optimized CSI setting that accommodates the uncertainty level or the confidence level.

In a sixth aspect, alone or in combination with one or more of the first through fifth aspects, the scheduling entity may receive the recommendation from the scheduled entity within a radio resource control (RRC) message, a medium access control (MAC) control element (MAC-CE), or uplink control information (UCI).

In a seventh aspect, alone or in combination with one or more of the first through sixth aspects, the scheduling entity may receive the recommendation from the scheduled entity within an initial CSI report.

In an eighth aspect, alone or in combination with one or more of the first through seventh aspects, the scheduling entity may transmit the optimized CSI setting to the scheduled entity within a radio resource control (RRC) reconfiguration message.

In a ninth aspect, alone or in combination with the first through eighth aspects, the scheduling entity may trigger the optimized CSI setting via a medium access control (MAC) control element (MAC-CE) or downlink control information (DCI).

In a tenth aspect, alone or in combination with one or more of the first through ninth aspects, the scheduling entity may receive from the scheduled entity a capability of the scheduled entity to provide the recommendation to the scheduling entity.

In an eleventh aspect, alone or in combination with the first through tenth aspects, the scheduling entity may receive at least one metric associated with the capability from the scheduled entity, identify at least one data-driven algorithm based on the at least one metric, and transmit the at least one data-driven algorithm to the scheduled entity.

Figure 13:
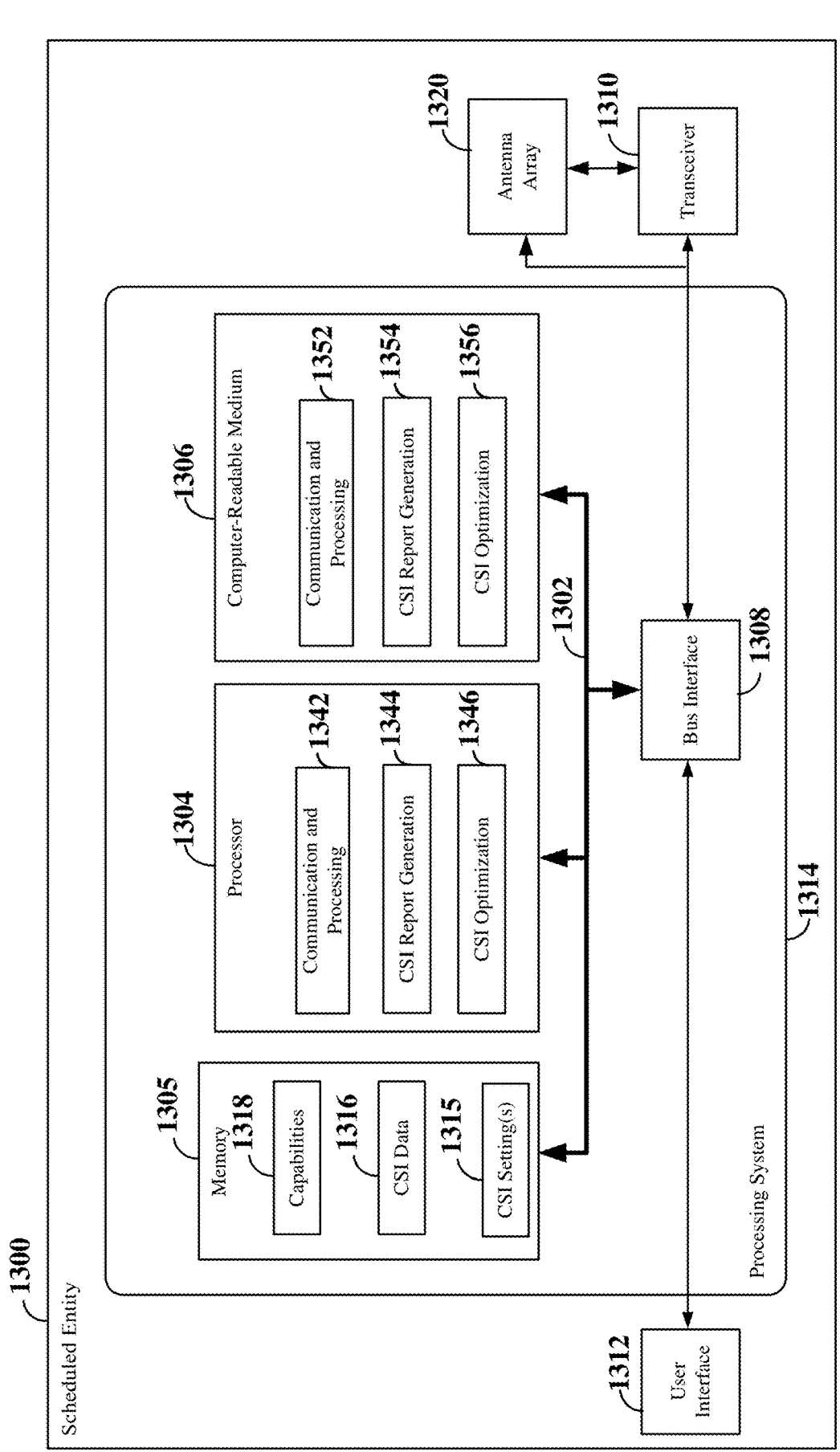
FIG. 13 is a block diagram illustrating an example of a hardware implementation of a scheduled entity employing a processing system according to some aspects.

FIG. 13 is a block diagram illustrating an example of a hardware implementation for a scheduled entity 1300 employing a processing system 1314. For example, the scheduled entity 1300 may correspond to any of the UEs or scheduled entities shown and described above in reference to FIGS. 1, 2, 5, 7, and/or 8.

In accordance with various aspects of the disclosure, an element, or any portion of an element, or any combination of elements may be implemented with a processing system 1314 that includes one or more processors 1304. The processing system 1314 may be substantially the same as the processing system 914 illustrated in FIG. 9, including a bus interface 1308, a bus 1302, memory 1305, a processor 1304, and a computer-readable medium 1306. Furthermore, the scheduled entity 1300 may include a user interface 1312, a transceiver 1310, and antenna array(s) 1320 substantially similar to those described above in FIG. 9. That is, the processor 1304, as utilized in a scheduled entity 1300, may be used to implement any one or more of the processes described below.

In some aspects of the disclosure, the processor 1304 may include circuitry configured for various functions. For example, the processor 1304 may include communication and processing circuitry 1342 configured to communicate with a scheduling entity (e.g., a base station, such as a gNB) via the transceiver 1310 and antenna array 1320. The communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may be configured to exchange control information and data with the scheduling entity via one or more subframes, slots, and/or mini-slots.

In some examples, the communication and processing circuitry 1342 may be configured to receive CSI setting(s) 1315 (e.g., CSI report setting(s) and/or CSI resource setting(s)) from the scheduling entity via, for example, semi-static RRC signaling. The communication and processing circuitry 1342 may further be configured to store the CSI setting(s) 1315 within the memory 1305. The communication and processing circuitry 1342 may further be configured to receive reference signals (e.g., CSI-RSs and/or SSBs)) from the scheduling entity on a set of CSI-RS ports and REs indicated in the CSI setting(s) 1315. For example, the communication and processing circuitry 1342 may be configured to receive each CSI-RS and/or SSB on a respective beam corresponding to the respective scheduling entity CSI-RS port via the transceiver 1310 and an antenna array 1320.

The communication and processing circuitry 1342 may further be configured to transmit a CSI report to the scheduling entity. In some examples, the CSI report may include respective CSI report quantities for a plurality of CSI report parameters (e.g., CQI, PMI, RI, SLI, L1-RSRP, or L1-SINR). The CQI may include a wideband CQI value and/or multiple sub-band CQI values, each including modulation and coding scheme (MCS) information (e.g., an MCS index).

The communication and processing circuitry 1342 may further be configured to transmit a recommendation to modify the CSI setting(s) 1315 to the scheduling entity via the transceiver 1310. The recommendation may be transmitted, for example, within an RRC message, a MAC-CE, or UCI. The recommendation may further be transmitted, for example, within the CSI report. In addition, the communication and processing circuitry 1342 may be configured to receive an optimized CSI setting 1315 from the scheduling entity based on the recommendation. For example, the optimized CSI setting 1315 may be received within an RRC reconfiguration message. The communication and processing circuitry 1342 may further be configured to trigger or activate the optimized CSI setting via a MAC-CE or DCI.

The communication and processing circuitry 1342 may further be configured to transmit a capability of the scheduled entity to provide the recommendation to the scheduling entity, transmit at least one metric associated with the capability to the scheduling entity, and/or receive at least one data-driven algorithm from the scheduling entity for use in generating the recommendation. The communication and processing circuitry 1342 may further be configured to execute communication and processing software 1352 stored in the computer-readable medium 1306 to implement one or more of the functions described herein.

The processor 1304 may further include CSI report generation circuitry 1344, configured to generate a CSI report including one or more CSI report quantities based on the CSI setting(s) 1315. In some examples, the CSI report generation circuitry 1344 may include the channel measurement circuitry 802, channel estimation circuitry 808, CSI quantity generation circuitry 812, and CSI report generation circuitry 816 shown in FIG. 8.

For example, the CSI report generation circuitry 1344 may be configured to measure one or more reference signals transmitted from a scheduling entity (e.g., a base station, such as a gNB or eNB, or other scheduling entity) to obtain, for example, the SINR and/or RSRP of each of the reference signals. For example, the one or more reference signals may be transmitted within one or more channel measurement resources and/or one or more interference measurement resources. The channel measurement resource(s) and interference measurement resource(s) may be determined based on the CSI setting(s) 1315 configured on the scheduled entity.

The CSI report generation circuitry 1344 may further be configured to estimate a wireless channel between the scheduled entity and the scheduling entity. The channel estimate may include a wideband channel estimate, a sub-band channel estimate, or a combination thereof. In addition, a respective channel estimate may obtained for each measured layer. The number and configuration of channel estimate(s) may be determined based on, for example, the current CSI setting(s) 1315. The CSI report generation circuitry 1344 may further be configured to generate the one or more CSI report quantities (e.g., CQI, RI, PMI, SLI, and/or L1 measurements) based on the channel estimate and/or the reference signal measurements. The particular CSI report quantities to generate may be determined, for example, based on the current CSI setting(s) 1315. The CSI report generation circuitry 1344 may further be configured to determine a configuration of the CSI report (e.g., periodicity, report type, report frequency granularity, other parameters to include, etc.) based on, for example, the current CSI setting(s) 1315.

For example, the CSI report generation circuitry 1344 may further be configured to execute CSI report generation software 1354 stored in the computer-readable medium 1306 to implement one or more of the functions described herein.

The processor 1304 may further include CSI optimization circuitry 1346, configured to generate a recommendation to modify the CSI setting 1315 configured on the scheduled entity 1300. In some examples, the CSI optimization circuitry 1346 may include the CSI optimization circuitry 822 shown in FIG. 8.

For example, the CSI optimization circuitry 1346 may be configured to perform an evaluation of the current CSI setting(s) 1315 (e.g., one or more CSI report settings and/or one or more CSI resource settings) and to generate at least one parameter associated with the current CSI setting(s) 1315 based on the evaluation. In some examples, the CSI optimization circuitry 1346 may perform the evaluation based on at least one of a channel between the scheduled entity and the scheduling entity, a capability of the scheduled entity, or a performance of the scheduled entity. For example, the CSI optimization circuitry 1346 may use one or more of CSI data 1316 and capabilities 1318 of the scheduled entity in performing the evaluation. The CSI data 1316 may include, for example, previously generated CSI report(s), channel conditions (e.g., the measured spectral efficiency, path loss, delay spread, etc.), performance of the scheduled entity (e.g., throughput, current amount of utilized computation resources, etc.), and other suitable CSI-related data. The capabilities 1318 of the scheduled entity may include, for example, one or more data-driven algorithms, such as ML algorithms, implemented on the scheduled entity.

In some examples, the at least one parameter may include an optimized configuration of the current CSI setting. For example, the optimized configuration of the CSI setting may include a respective optimized configuration of at least one of a CSI report periodicity, a CSI report type, a CSI report quantity (e.g., CQI, PMI, RI, SLI, L1 measurement, etc.), a CSI report frequency granularity, or a CSI resource set. For example, the optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter may include soft output, such as an uncertainty level or confidence level associated with the current CSI setting. The uncertainty level or confidence level may indicate whether the CSI setting can be further optimized.

The CSI optimization circuitry 1346 may further be configured to generate the recommendation to modify the current CSI setting(s) 1315 based on the at least one parameter. In some examples, the recommendation can include the at least one parameter. For example, the recommendation can include the optimized configuration of the CSI setting or the soft output (e.g., uncertainty level or confidence level). The recommendation may further be transmitted to a scheduling entity to update the CSI setting(s) with optimized CSI setting(s) selected by the scheduling entity based on the recommendation.

The CSI optimization circuitry 1346 may then further be configured to receive the optimized CSI setting(s) from the scheduling entity and to update the CSI setting(s) 1315 stored in the memory 1305 with the optimized CSI setting(s) 1315. In some examples, based on the capabilities 1318, the CSI optimization circuitry 1346 may be configured to predict the optimized CSI setting using at least one data-driven algorithm.

The CSI optimization circuitry 1346 may further be configured to transmit a capability of the scheduled entity to provide the recommendation to modify the CSI setting(s) 1315. For example, the scheduled entity may indicate its capability to provide the recommendation in one or more scenarios. In some examples, the scheduled entity may indicate its capability to predict CSI for future time slots, determine whether the predicted CSI represents a significant change with respect to previously reported CSI using channel prediction algorithms, interpolate CSI between frequency bands, or use downlink CSI to predict uplink CSI on the same or different frequency band. The capability indication may further be granular (e.g., the scheduled entity may be able to predict in only certain frequency bands or within a certain bandwidth).

As another example, the CSI optimization circuitry 1346 may indicate the capability of the scheduled entity to provide the recommendation by providing at least one metric associated with the capability. For example, the scheduled entity may indicate its capability to perform advanced algorithms by including the number of multiplications per second, memory capacity, and other suitable processing capabilities of the scheduled entity. In this example, the CSI optimization circuitry 1346 may be configured to receive at least one data-driven algorithm selected by the scheduling entity based on the at least one metric. The CSI optimization circuitry 1346 may store the data-driven algorithm as part of the capabilities 1318 of the scheduled entity for use in identifying the at least one parameter and generating the recommendation. The CSI optimization circuitry 1346 may be configured to execute CSI optimization software 1356 stored in the computer-readable medium 1306 to implement one or more of the functions described herein.

Figure 14:
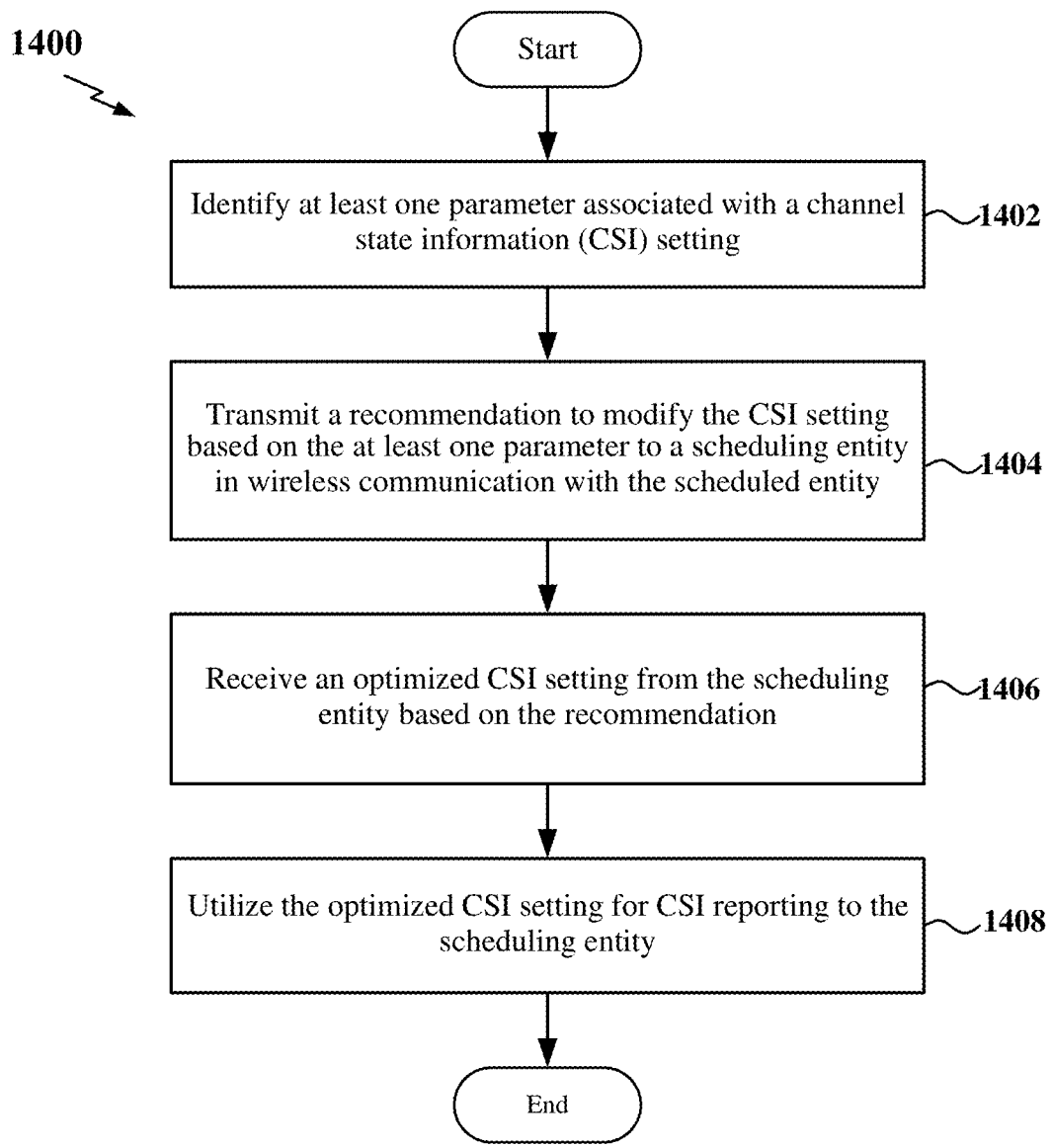
FIG. 14 is a flow chart of an exemplary method for a scheduled entity to optimize a CSI setting according to some aspects.

FIG. 14 is a flow chart 1400 of a method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1300, as described above and illustrated in FIG. 13, by a processor or processing system, or by any suitable means for carrying out the described functions.

At block 1402, the scheduled entity may identify at least one parameter associated with a channel state information (CSI) setting (e.g., CSI report setting or CSI resource setting). In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter includes an uncertainty level or confidence level associated with the CSI setting. For example, the CSI optimization circuitry 1346 shown and described above in connection with FIG. 13 may identify the at least one parameter associated with the CSI setting.

At block 1404, the scheduled entity may transmit a recommendation to modify the CSI setting based on the at least one parameter to a scheduling entity in wireless communication with the scheduled entity. In some examples, the recommendation can include the at least one parameter. In some examples, the scheduled entity may transmit the recommendation to the scheduling entity within an RRC message, a MAC-CE, or UCI. In some examples, the scheduled entity may transmit a CSI report including the recommendation to the scheduling entity. For example, the CSI optimization circuitry 1346, together with the communication and processing circuitry 1342 and transceiver 1310, shown and described above in connection with FIG. 13 may transmit the recommendation to the scheduling entity.

At block 1406, the scheduled entity may receive an optimized CSI setting from the scheduling entity based on the recommendation. In some examples, the optimized CSI setting includes the optimized configuration of the CSI setting. In some examples, the optimized CSI setting accommodates the uncertainty level or the confidence level. In some examples, the scheduled entity may receive the optimized CSI setting from the scheduling entity within an RRC reconfiguration message. In some examples, the optimized CSI setting may be triggered (or otherwise activated) via a MAC-CE or DCI. For example, the CSI optimization circuitry 1346, together with the communication and processing circuitry 1342 and transceiver 1310, shown and described above in connection with FIG. 13 may receive the optimized CSI setting.

At block 1408, the scheduled entity may utilize the optimized CSI setting for CSI reporting to the scheduling entity. In some examples, the scheduled entity may generate a CSI report based on the optimized CSI setting and transmit the CSI report to the scheduling entity. For example, the CSI report generation circuitry 1344, together with the communication and processing circuitry 1342 and transceiver 1310, shown and described above in connection with FIG. 13 may utilize the optimized CSI setting for CSI reporting.

Figure 15:
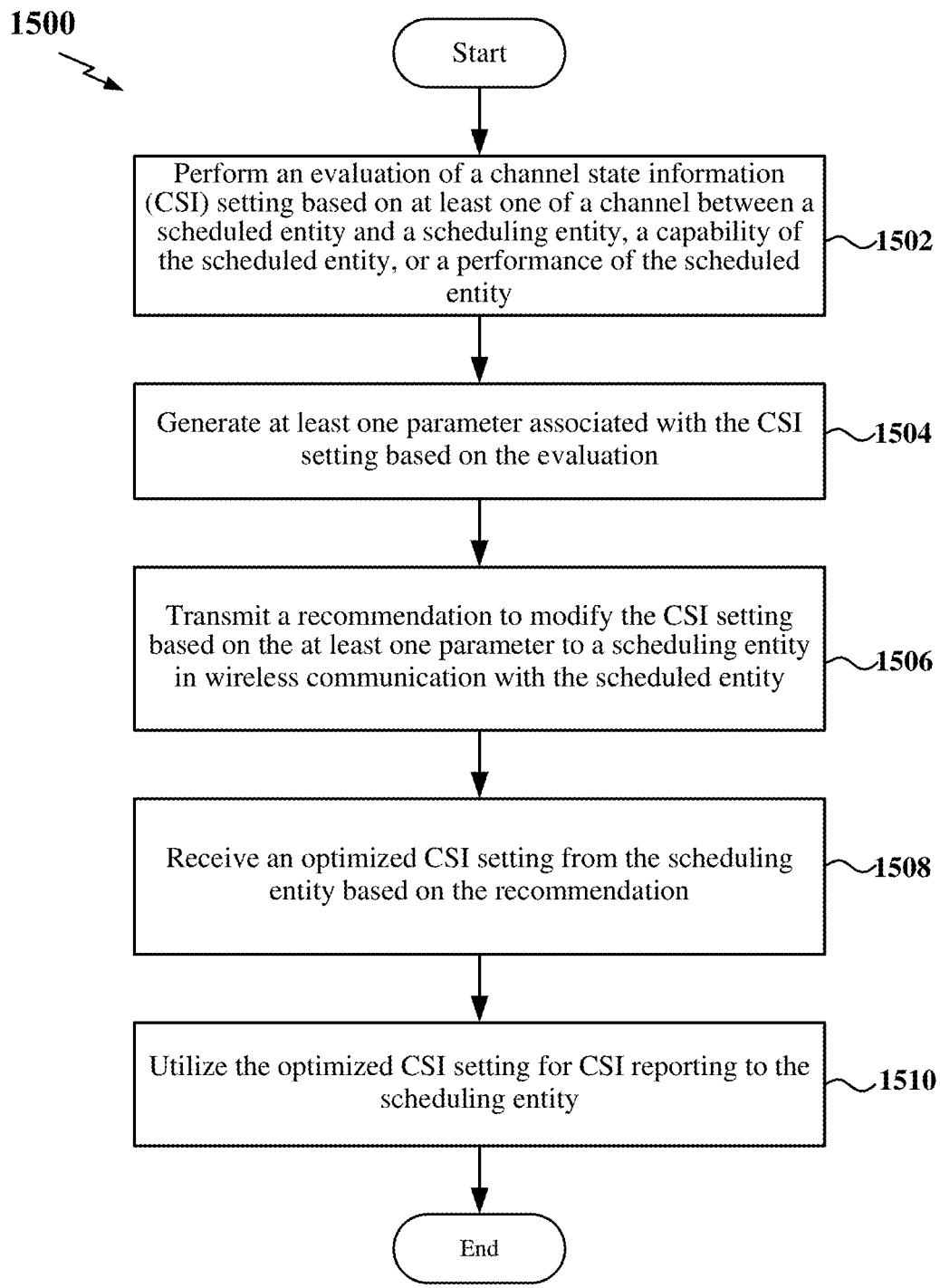
FIG. 15 is a flow chart of another exemplary method for a scheduled entity to optimize a CSI setting according to some aspects.

FIG. 15 is a flow chart 1500 of another method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1300, as described above and illustrated in FIG. 13, by a processor or processing system, or by any suitable means for carrying out the described functions.

At block 1502, the scheduled entity may perform an evaluation of a channel state information (CSI) setting (e.g., CSI report setting or CSI resource setting) based on at least one of a channel between a scheduled entity and a scheduling entity, a capability of the scheduled entity, or a performance of the scheduled entity. For example, the scheduled entity may utilize previously generated CSI report(s) and/or channel conditions (e.g., the measured spectral efficiency, path loss, delay spread, etc.) in evaluating the CSI setting. In addition, the scheduled entity may utilize the throughput, current amount of utilized computation resources, and/or other performance factors of the scheduled entity in evaluating the CSI setting. Furthermore, the scheduled entity may use one or more data-driven algorithms, such as ML algorithms, implemented on the scheduled entity in evaluating the CSI setting. For example, the CSI optimization circuitry 1346 shown and described above in connection with FIG. 13 may perform the evaluation of the CSI setting.

At block 1504, the scheduled entity may generate at least one parameter associated with the CSI setting based on the evaluation. In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter includes an uncertainty level or confidence level associated with the CSI setting. For example, the CSI optimization circuitry 1346 shown and described above in connection with FIG. 13 may identify the at least one parameter associated with the CSI setting.

At block 1506, the scheduled entity may transmit a recommendation to modify the CSI setting based on the at least one parameter to a scheduling entity in wireless communication with the scheduled entity. In some examples, the recommendation can include the at least one parameter. In some examples, the scheduled entity may transmit the recommendation to the scheduling entity within an RRC message, a MAC-CE, or UCI. In some examples, the scheduled entity may transmit a CSI report including the recommendation to the scheduling entity. For example, the CSI optimization circuitry 1346, together with the communication and processing circuitry 1342 and transceiver 1310, shown and described above in connection with FIG. 13 may transmit the recommendation to the scheduling entity.

At block 1508, the scheduled entity may receive an optimized CSI setting from the scheduling entity based on the recommendation. In some examples, the optimized CSI setting includes the optimized configuration of the CSI setting. In some examples, the optimized CSI setting accommodates the uncertainty level or the confidence level. In some examples, the scheduled entity may receive the optimized CSI setting from the scheduling entity within an RRC reconfiguration message. In some examples, the optimized CSI setting may be triggered (or otherwise activated) via a MAC-CE or DCI. For example, the CSI optimization circuitry 1346, together with the communication and processing circuitry 1342 and transceiver 1310, shown and described above in connection with FIG. 13 may receive the optimized CSI setting.

At block 1510, the scheduled entity may utilize the optimized CSI setting for CSI reporting to the scheduling entity. In some examples, the scheduled entity may generate a CSI report based on the optimized CSI setting and transmit the CSI report to the scheduling entity. For example, the CSI report generation circuitry 1344, together with the communication and processing circuitry 1342 and transceiver 1310, shown and described above in connection with FIG. 13 may utilize the optimized CSI setting for CSI reporting.

Figure 16:
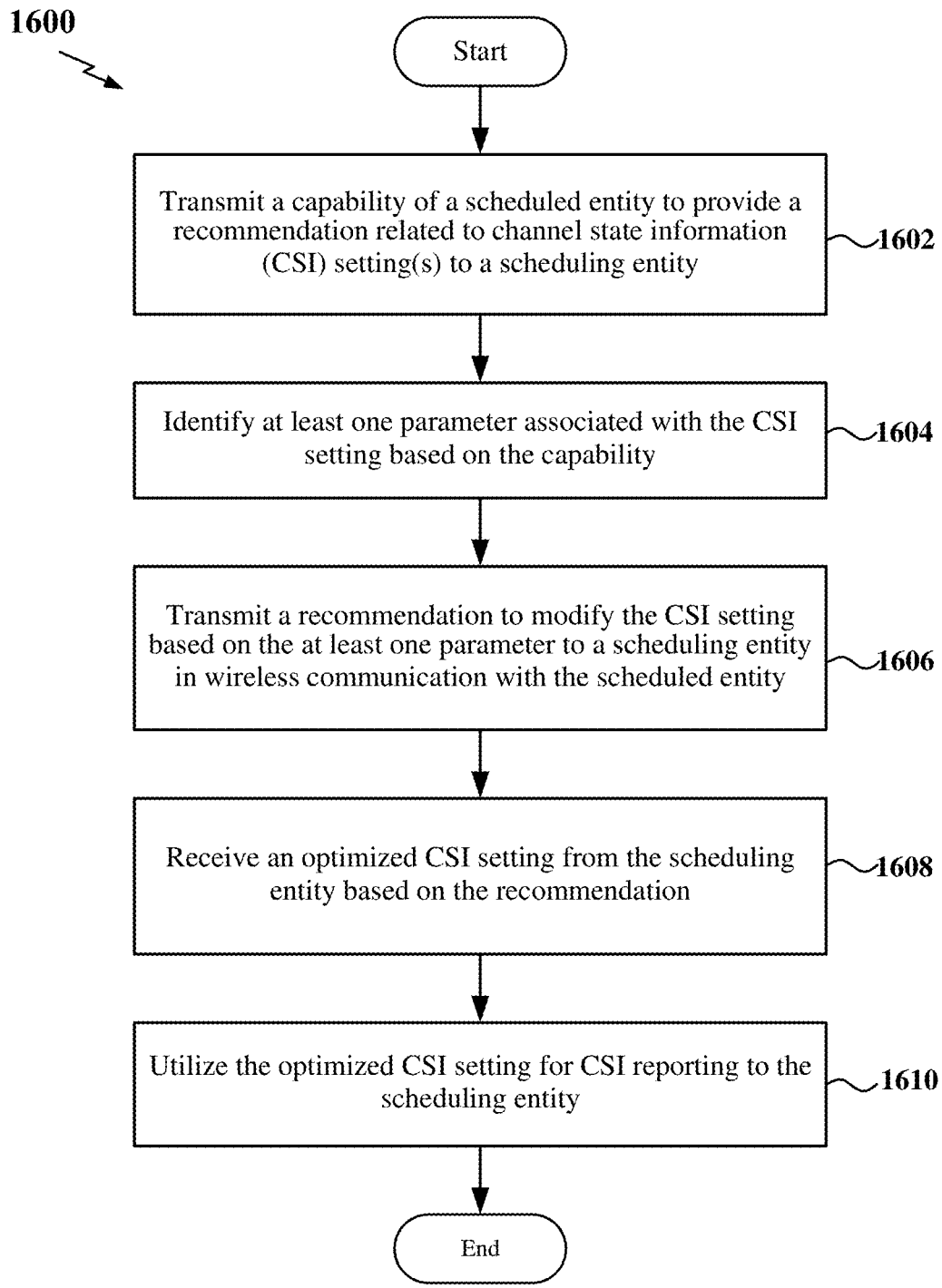
FIG. 16 is a flow chart of another exemplary method for a scheduled entity to optimize a CSI setting according to some aspects.

FIG. 16 is a flow chart 1600 of another method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1300, as described above and illustrated in FIG. 13, by a processor or processing system, or by any suitable means for carrying out the described functions.

At block 1602, the scheduled entity may transmit a capability of a scheduled entity to provide a recommendation related to channel state information (CSI) setting(s) (e.g., CSI report setting(s) and/or CSI resource setting(s)) to a scheduling entity. For example, the scheduled entity may indicate its capability to provide the recommendation using one or more data-driven algorithms implemented on (running on) the scheduled entity. In some examples, the scheduled entity may indicate its capability to predict CSI for future time slots, determine whether the predicted CSI represents a significant change with respect to previously reported CSI using channel prediction algorithms, interpolate CSI between frequency bands, or use downlink CSI to predict uplink CSI on the same or different frequency band. The capability indication may further be granular (e.g., the scheduled entity may be able to predict in only certain frequency bands or within a certain bandwidth). For example, the CSI optimization circuitry 1346, together with the communication and processing circuitry 1342 and transceiver 1310, shown and described above in connection with FIG. 13 may transmit the capability of the scheduled entity to provide the recommendation to the scheduling entity.

At block 1604, the scheduled entity may identify at least one parameter associated with the CSI setting based on the capability (e.g., using the one or more data-driven algorithms). In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter includes an uncertainty level or confidence level associated with the CSI setting. For example, the CSI optimization circuitry 1346 shown and described above in connection with FIG. 13 may identify the at least one parameter associated with the CSI setting.

At block 1606, the scheduled entity may transmit a recommendation to modify the CSI setting based on the at least one parameter to a scheduling entity in wireless communication with the scheduled entity. In some examples, the recommendation can include the at least one parameter. In some examples, the scheduled entity may transmit the recommendation to the scheduling entity within an RRC message, a MAC-CE, or UCI. In some examples, the scheduled entity may transmit a CSI report including the recommendation to the scheduling entity. For example, the CSI optimization circuitry 1346, together with the communication and processing circuitry 1342 and transceiver 1310, shown and described above in connection with FIG. 13 may transmit the recommendation to the scheduling entity.

At block 1608, the scheduled entity may receive an optimized CSI setting from the scheduling entity based on the recommendation. In some examples, the optimized CSI setting includes the optimized configuration of the CSI setting. In some examples, the optimized CSI setting accommodates the uncertainty level or the confidence level. In some examples, the scheduled entity may receive the optimized CSI setting from the scheduling entity within an RRC reconfiguration message. In some examples, the optimized CSI setting may be triggered (or otherwise activated) via a MAC-CE or DCI. For example, the CSI optimization circuitry 1346, together with the communication and processing circuitry 1342 and transceiver 1310, shown and described above in connection with FIG. 13 may receive the optimized CSI setting.

At block 1610, the scheduled entity may utilize the optimized CSI setting for CSI reporting to the scheduling entity. In some examples, the scheduled entity may generate a CSI report based on the optimized CSI setting and transmit the CSI report to the scheduling entity. For example, the CSI report generation circuitry 1344, together with the communication and processing circuitry 1342 and transceiver 1310, shown and described above in connection with FIG. 13 may utilize the optimized CSI setting for CSI reporting.

Figure 17:
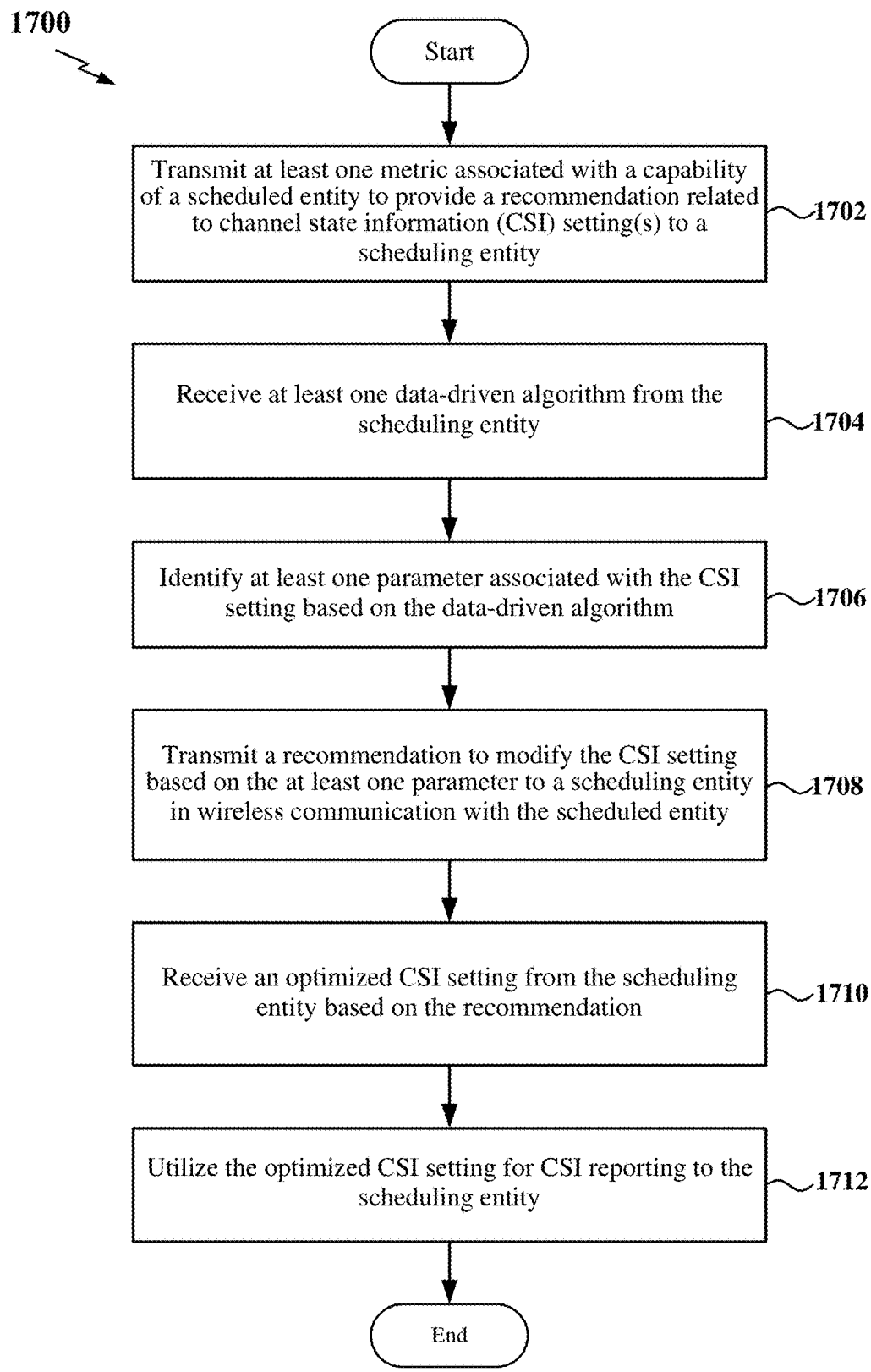
FIG. 17 is a flow chart of another exemplary method for a scheduled entity to optimize a CSI setting according to some aspects.

FIG. 17 is a flow chart 1700 of another method for a scheduled entity (e.g., a UE) to optimize a CSI setting according to some aspects. As described below, some or all illustrated features may be omitted in a particular implementation within the scope of the present disclosure, and some illustrated features may not be required for implementation of all embodiments. In some examples, the method may be performed by the scheduled entity 1300, as described above and illustrated in FIG. 13, by a processor or processing system, or by any suitable means for carrying out the described functions.

At block 1702, the scheduled entity may transmit at least one metric associated with a capability of the scheduled entity to provide a recommendation related to channel state information (CSI) setting(s) (e.g., CSI report setting(s) and/or CSI resource setting(s)) to a scheduling entity. For example, the scheduled entity may indicate its capability to perform advanced algorithms by including the number of multiplications per second, memory capacity, and other suitable processing capabilities of the scheduled entity. For example, the CSI optimization circuitry 1346, together with the communication and processing circuitry 1342 and transceiver 1310, shown and described above in connection with FIG. 13 may transmit the at least one metric to the scheduling entity.

At block 1704, the scheduled entity may receive at least one data-driven algorithm from the scheduling entity. The data-driven algorithm(s) may be selected by the scheduling entity based on the at least one metric. For example, the CSI optimization circuitry 1346, together with the communication and processing circuitry 1342 and transceiver 1310, shown and described above in connection with FIG. 13 may receive the at least one data-driven algorithm from the scheduling entity.

At block 1706, the scheduled entity may identify at least one parameter associated with the CSI setting based on the data-driven algorithm. In some examples, the at least one parameter includes an optimized configuration of the CSI setting. For example, the optimized configuration of the CSI setting may include a respective optimized configuration of at least one of a CSI report type, a CSI report periodicity, a CSI resource set, a CSI report quantity, or a CSI report frequency granularity. The respective optimized configuration of the CSI resource set may include at least one of an optimized resource configuration of resources within the CSI resource set, additional resources to include in at least the CSI resource set, or one or more additional CSI resource sets including the CSI resource set. In other examples, the at least one parameter includes an uncertainty level or confidence level associated with the CSI setting. For example, the CSI optimization circuitry 1346 shown and described above in connection with FIG. 13 may identify the at least one parameter associated with the CSI setting.

At block 1708, the scheduled entity may transmit a recommendation to modify the CSI setting based on the at least one parameter to a scheduling entity in wireless communication with the scheduled entity. In some examples, the recommendation can include the at least one parameter. In some examples, the scheduled entity may transmit the recommendation to the scheduling entity within an RRC message, a MAC-CE, or UCI. In some examples, the scheduled entity may transmit a CSI report including the recommendation to the scheduling entity. For example, the CSI optimization circuitry 1346, together with the communication and processing circuitry 1342 and transceiver 1310, shown and described above in connection with FIG. 13 may transmit the recommendation to the scheduling entity.

At block 1710, the scheduled entity may receive an optimized CSI setting from the scheduling entity based on the recommendation. In some examples, the optimized CSI setting includes the optimized configuration of the CSI setting. In some examples, the optimized CSI setting accommodates the uncertainty level or the confidence level. In some examples, the scheduled entity may receive the optimized CSI setting from the scheduling entity within an RRC reconfiguration message. In some examples, the optimized CSI setting may be triggered (or otherwise activated) via a MAC-CE or DCI. For example, the CSI optimization circuitry 1346, together with the communication and processing circuitry 1342 and transceiver 1310, shown and described above in connection with FIG. 13 may receive the optimized CSI setting.

At block 1712, the scheduled entity may utilize the optimized CSI setting for CSI reporting to the scheduling entity. In some examples, the scheduled entity may generate a CSI report based on the optimized CSI setting and transmit the CSI report to the scheduling entity. For example, the CSI report generation circuitry 1344, together with the communication and processing circuitry 1342 and transceiver 1310, shown and described above in connection with FIG. 13 may utilize the optimized CSI setting for CSI reporting.

In one configuration, the scheduled entity 1300 includes means for performing the various functions and processes described in relation to FIGS. 14-17. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 5, 7 and/or 8, and utilizing, for example, the processes and/or algorithms described herein in relation to FIGS. 14-17.

The processes shown in FIGS. 14-17 may include additional aspects, such as any single aspect or any combination of aspects described below and/or in connection with one or more other processes described elsewhere herein.

In a first aspect, a scheduled entity (e.g., a UE) in a wireless communication network may identify at least one parameter associated with a channel state information (CSI) setting, transmit a recommendation to modify the CSI setting based on the at least one parameter to a scheduling entity in wireless communication with the scheduled entity, receive an optimized CSI setting from the scheduling entity based on the recommendation, and utilize the optimized CSI setting for CSI reporting to the scheduling entity.

In a second aspect, alone or in combination with the first aspect, the at least one parameter includes an optimized configuration of the CSI setting and the optimized CSI setting includes the optimized configuration.

In a third aspect, alone or in combination with one or more of the first aspect and the second aspect, the optimized configuration of the CSI setting includes a respective optimized configuration of at least one of a CSI report type, a CSI report periodicity, a CSI resource set, a CSI report quantity, or a CSI report frequency granularity.

In a fourth aspect, alone or in combination with one or more of the first through third aspects, the respective optimized configuration of the CSI resource set includes at least one of an optimized resource configuration of resources within the CSI resource set, additional resources to include in at least the CSI resource set, or one or more additional CSI resource sets including the CSI resource set.

In a fifth aspect, alone or in combination with one or more of the first through fourth aspects, the at least one parameter includes an uncertainty level or a confidence level associated with the CSI setting and the optimized CSI setting accommodates the uncertainty level or the confidence level.

In a sixth aspect, alone or in combination with one or more of the first through fifth aspects, the recommendation includes the at least one parameter.

In a seventh aspect, alone or in combination with one or more of the first through sixth aspects, the scheduled entity may transmit the recommendation to the scheduling entity within a radio resource control (RRC) message, a medium access control (MAC) control element (MAC-CE), or uplink control information (UCI).

In an eighth aspect, alone or in combination with one or more of the first through seventh aspects, the scheduled entity may transmit a CSI report including the recommendation to the scheduling entity.

In a ninth aspect, alone or in combination with one or more of the first through eighth aspects, the scheduled entity may receive the optimized CSI setting from the scheduling entity within a radio resource control (RRC) reconfiguration message.

In a tenth aspect, alone or in combination with one or more of the first through ninth aspects, the scheduled entity may trigger the optimized CSI setting via a medium access control (MAC) control element (MAC-CE) or downlink control information (DCI).

In an eleventh aspect, alone or in combination with one or more of the first through tenth aspects, the scheduled entity may perform an evaluation of the CSI setting based on at least one of a channel between the scheduled entity and the scheduling entity, a capability of the scheduled entity, or a performance of the scheduled entity, and generate the at least one parameter based on the evaluation.

In a twelfth aspect, alone or in combination with one or more of the first through eleventh aspects, the scheduled entity may predict the optimized CSI setting using at least one data-driven algorithm.

In a thirteenth aspect, alone or in combination with one or more of the first through twelfth aspects, the scheduled entity may transmit to the scheduling entity a capability of the scheduled entity to provide the recommendation to the scheduling entity.

In a fourteenth aspect, alone or in combination with one or more of the first through thirteenth aspects, the scheduled entity may transmit at least one metric associated with the capability to the scheduling entity, and receive at least one data-driven algorithm from the scheduling entity for use in identifying the at least one parameter.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 7-9, and 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a scheduled entity in a wireless communication network, the method comprising:

transmitting, to a scheduling entity in wireless communication with the scheduled entity, a recommendation for modifying a channel state information (CSI) setting currently configured for the scheduled entity based on at least one parameter associated with the CSI setting, the CSI setting indicating at least one of resources on which one or more reference signals are to be received by the scheduled entity or CSI related parameters to be reported by the scheduled entity based on the one or more reference signals;

receiving an optimized CSI setting from the scheduling entity based on the recommendation; and utilizing the optimized CSI setting for CSI reporting to the scheduling entity.

2. The method of claim 1, wherein the at least one parameter comprises an optimized configuration of the CSI setting and the optimized CSI setting comprises the optimized configuration.

3. The method of claim 2, wherein the optimized configuration of the CSI setting comprises a respective optimized configuration of at least one of a CSI report type, a CSI report periodicity, a CSI resource set, a CSI report quantity, or a CSI report frequency granularity.

4. The method of claim 3, wherein the respective optimized configuration of the CSI resource set comprises at least one of an optimized resource configuration of resources within the CSI resource set, additional resources to include in at least the CSI resource set, or one or more additional CSI resource sets comprising the CSI resource set.

5. The method of claim 1, wherein the at least one parameter comprises an uncertainty level or a confidence level associated with the CSI setting and the optimized CSI setting accommodates the uncertainty level or the confidence level.

6. The method of claim 1, wherein the recommendation comprises the at least one parameter.

7. The method of claim 1, wherein the transmitting the recommendation to the scheduling entity comprises:
transmitting the recommendation to the scheduling entity within a radio resource control (RRC) message, a medium access control (MAC) control element (MAC-CE), or uplink control information (UCI).

8. The method of claim 1, wherein the transmitting the recommendation to the scheduling entity comprises:
transmitting a CSI report comprising the recommendation to the scheduling entity.

9. The method of claim 1, wherein the receiving the optimized CSI setting from the scheduling entity comprises:
receiving the optimized CSI setting from the scheduling entity within a radio resource control (RRC) reconfiguration message.

10. The method of claim 1, wherein the receiving the optimized CSI setting from the scheduling entity comprises:
triggering the optimized CSI setting via a medium access control (MAC) control element (MAC-CE) or downlink control information (DCI).

11. The method of claim 1, further comprising:
performing an evaluation of the CSI setting based on at least one of a channel between the scheduled entity and the scheduling entity, a capability of the scheduled entity, or a performance of the scheduled entity; and
generating the at least one parameter based on the evaluation.

12. The method of claim 11, wherein the performing the evaluation of the CSI setting further comprises:
predicting the optimized CSI setting using at least one data-driven algorithm.

13. The method of claim 11, wherein the evaluation of the CSI setting is based at least in part on at least one previously generated CSI report for the channel between the scheduled entity and the scheduling entity.

14. The method of claim 1, further comprising:
transmitting to the scheduling entity a capability of the scheduled entity to provide the recommendation to the scheduling entity.

15. The method of claim 14, wherein the transmitting to the scheduling entity the capability of the scheduled entity to provide the recommendation to the scheduling entity further comprises:
transmitting at least one metric associated with the capability to the scheduling entity; and
receiving at least one data-driven algorithm from the scheduling entity for use in identifying the at least one parameter.

16. The method of claim 1, the CSI setting indicating the resources on which the one or more reference signals are to be received by the scheduled entity.

17. The method of claim 1, the CSI setting indicating the CSI related parameters to be reported by the scheduled entity based on the one or more reference signals.

18. A method for wireless communication at a scheduling entity in a wireless communication network, the method comprising:
receiving, from a scheduled entity in wireless communication with the scheduling entity, a recommendation to modify a channel state information (CSI) setting currently configured for the scheduled entity based on at least one parameter associated with the CSI setting, the CSI setting indicating at least one of resources on which one or more reference signals are to be received by the scheduled entity or CSI related parameters to be reported by the scheduled entity based on the one or more reference signals;
transmitting an optimized CSI setting to the scheduled entity based at least in part on the recommendation; and
receiving a CSI report from the scheduled entity based on the optimized CSI setting.

19. The method of claim 18, wherein the recommendation comprises the at least one parameter and the at least one parameter comprises an optimized configuration of the CSI setting, and wherein the method further comprises:
identifying the optimized CSI setting comprising the optimized configuration.

20. The method of claim 19, wherein the optimized configuration of the CSI setting comprises a respective optimized configuration of at least one of a CSI report type, a CSI report periodicity, a CSI resource set, a CSI report quantity, or a CSI report frequency granularity.

21. The method of claim 20, wherein the respective optimized configuration of the CSI resource set comprises at least one of an optimized resource configuration of resources within the CSI resource set, additional resources to include in at least the CSI resource set, or one or more additional CSI resource sets comprising the CSI resource set.

22. The method of claim 18, wherein the recommendation comprises the at least one parameter and the at the least one parameter comprises an uncertainty level or a confidence level associated with the CSI setting, and wherein the method further comprises:
identifying the optimized CSI setting that accommodates the uncertainty level or the confidence level.

23. The method of claim 18, wherein the receiving the recommendation from the scheduled entity comprises:
receiving the recommendation from the scheduled entity within a radio resource control (RRC) message, a medium access control (MAC) control element (MAC-CE), or uplink control information (UCI).

24. The method of claim 18, wherein the receiving the recommendation from the scheduled entity comprises:
receiving the recommendation from the scheduled entity within an initial CSI report.

25. The method of claim 18, wherein the transmitting the optimized CSI setting to the scheduled entity comprises:
transmitting the optimized CSI setting to the scheduled entity within a radio resource control (RRC) reconfiguration message.

26. The method of claim 18, wherein the transmitting the optimized CSI setting to the scheduled entity comprises:
triggering the optimized CSI setting via a medium access control (MAC) control element (MAC-CE) or downlink control information (DCI).

27. The method of claim 18, further comprising:
receiving from the scheduled entity a capability of the scheduled entity to provide the recommendation to the scheduling entity.

28. The method of claim 27, wherein the receiving from the scheduled entity the capability of the scheduled entity to provide the recommendation to the scheduling entity further comprises:
receiving at least one metric associated with the capability from the scheduled entity; wherein the method further comprises:
transmitting the at least one data-driven algorithm to the scheduled entity based at least in part on the at least one metric.

29. A scheduled entity in a wireless communication network, comprising:
a wireless transceiver;
a memory; and a processor communicatively coupled to the wireless transceiver and the memory, wherein the processor and the memory are configured to:

transmit, to a scheduling entity in wireless communication with the scheduled entity, a recommendation for modifying a channel state information (CSI) setting currently configured for the scheduled entity based on at least one parameter associated with the CSI setting, the CSI setting indicating at least one of resources on which one or more reference signals are to be received by the scheduled entity or CSI related parameters to be reported by the scheduled entity based on the one or more reference signals;

receive an optimized CSI setting from the scheduling entity based on the recommendation via the wireless transceiver; and utilize the optimized CSI setting for CSI reporting to the scheduling entity.

30. The scheduled entity of claim 29, wherein the at least one parameter comprises an optimized configuration of the CSI setting and the optimized CSI setting comprises the optimized configuration, and wherein the optimized configuration of the CSI setting comprises a respective optimized configuration of at least one of a CSI report type, a CSI report periodicity, a CSI resource set, a CSI report quantity, or a CSI report frequency granularity.

31. The scheduled entity of claim 29, wherein the at least one parameter comprises an uncertainty level or a confidence level associated with the CSI setting and the optimized CSI setting accommodates the uncertainty level or the confidence level.

32. A scheduling entity in a wireless communication network, comprising:

a wireless transceiver;

a memory; and a processor communicatively coupled to the wireless transceiver and the memory, wherein the processor and the memory are configured to:

receive, from a scheduled entity in wireless communication with the scheduling entity, a recommendation to modify a channel state information (CSI) setting currently configured for the scheduled entity based on at least one parameter associated with the CSI setting, the CSI setting indicating at least one of resources on which one or more reference signals are to be received by the scheduled entity or CSI related parameters to be reported by the scheduled entity based on the one or more reference signals;

transmit an optimized CSI setting to the scheduled entity based at least in part on the recommendation; and receive a CSI report from the scheduled entity based on the optimized CSI setting.

33. The scheduling entity of claim 32, wherein the recommendation comprises the at least one parameter and the at least one parameter comprises an optimized configuration of the CSI setting, an uncertainty level associated with the CSI setting, or a confidence level associated with the CSI setting, and wherein the identifying the optimized CSI setting further comprises:

identifying the optimized CSI setting that comprises the optimized configuration or accommodates the uncertainty level or the confidence level.

* * * * *